United States Patent
Horiuchi

(10) Patent No.: US 7,417,802 B2
(45) Date of Patent: Aug. 26, 2008

(54) ZOOM LENS AND IMAGE PICKUP APPARATUS EQUIPPED WITH SAME

(75) Inventor: Akihisa Horiuchi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 17 days.

(21) Appl. No.: 11/743,372

(22) Filed: May 2, 2007

(65) Prior Publication Data

US 2007/0273980 A1 Nov. 29, 2007

(30) Foreign Application Priority Data

May 25, 2006 (JP) ............................ 2006-145153

(51) Int. Cl.
*G02B 15/14* (2006.01)

(52) U.S. Cl. ................. 359/687; 359/686; 359/774; 359/772

(58) Field of Classification Search ................. 359/687, 359/686, 774, 769, 772, 765, 766

See application file for complete search history.

(56) References Cited

U.S. PATENT DOCUMENTS 5,694,252 A 12/1997 Yahagi
7,268,955 B2 * 9/2007 Ogata .......................... 359/690

FOREIGN PATENT DOCUMENTS

| JP | 11-287952 | 10/1999 |
| JP | 11-287954 | 10/1999 |
| JP | 2002-365539 | 12/2002 |

* cited by examiner

*Primary Examiner*—Timothy J Thompson
(74) *Attorney, Agent, or Firm*—Cowan, Liebowitz & Latman, P.C.

(57) ABSTRACT

A zoom lens comprises, in the following order from the object side to the image side, a positive first lens unit, a negative second lens unit, which moves during zooming, a positive third lens unit, and a positive fourth lens unit, which moves during zooming. The first lens unit includes a negative lens subunit and a positive lens subunit. The negative lens subunit includes at least two negative lenses each having a concave surface facing the image side and at least one positive lens arranged from the object side. The positive lens subunit includes at least one biconvex positive lens, a negative lens and at least two positive lenses arranged from the object side, or at least one biconvex positive lens, a cemented lens composed of a negative lens and a positive lens and at least one positive lens arranged from the object side.

19 Claims, 33 Drawing Sheets

ZOOM LENS AND IMAGE PICKUP APPARATUS EQUIPPED WITH SAME

BACKGROUND OF THE INVENTION

1. Field of the Invention

The present invention relates to a zoom lens and an image pickup apparatus equipped with the same. The present invention can be suitably applied to an electronic camera such as a video camera or a digital still camera, a film camera, and a broadcast camera etc.

2. Description of the Related Art

In recent years, image pickup apparatuses (or cameras) such as video cameras, digital still cameras and surveillance cameras using a solid state image pickup element are required to have many functions and to be small in their entire size.

In accordance with such requirements, optical systems (image pickup optical systems) used in such cameras are required to be constructed as zoom lenses that are small in size, have a wide angle of view while having excellent optical performance.

When a color separating optical system such as a prism or filter is used in an image pickup apparatus, the color separating optical system is provided in its image side end portion. Accordingly, zoom lenses used in such image pickup apparatuses are required to have back focus equal to the optical path length of the color separating optical system.

As a zoom lens that meets the above requirements, a four-unit zoom lens having a positive first lens unit, a negative second lens unit, a positive third lens unit and a positive fourth lens unit arranged in the mentioned order from the object side to the image side is known. Note that a lens unit or element having a positive optical power or positive refractive power is referred to as a positive lens unit or element in this specification, and a lens unit or element having a negative optical power or refractive power is referred to as a negative lens unit or element.

One known type of such a four-unit zoom lens is what is called a rear-focus four-unit zoom lens in which the second lens unit is moved to effect zooming and the fourth lens unit is moved to correct image plane variations caused during zooming and to effect focusing.

There have been disclosed various rear-focus four-unit zoom lenses that have the first lens unit including a negative front subunit and a positive rear subunit arranged in the mentioned order from the object side to the image side to achieve a wide angle of view (see Japanese Patent Application Laid-Open Nos. H11-287952 and H11-287954).

A five-unit zoom lens having a positive first lens unit, a negative second lens unit, a positive third lens unit, a positive fourth lens unit and a positive fifth lens unit arranged in the mentioned order from the object side to the image side is also known as a zoom lens that meets the above described requirements.

In a known type of such a five-unit zoom lens that has a relatively wide angle of view, the second lens unit and the fourth lens unit are moved for zooming, and the fourth lens unit is moved for focusing (see U.S. Pat. No. 5,694,252 and Japanese Patent Application Laid-Open No. 2002-365539).

When a zoom lens is constructed as a rear focus system, the size of the entire lens system can be made smaller, focusing can be made faster and short distance shooting can be made easier as compared to zoom lenses in which focusing is effected by the first lens unit.

On the other hand, however, the rear focus zoom lens suffers from larger aberration variations during focusing.

It is difficult to achieve a wide angle of view and a high zoom ratio while achieving excellent optical performance throughout the entire zoom range.

To achieve a wide angle of view and a high zoom ratio in a rear-focus zoom lens while achieving excellent optical performance throughout the entire zoom range, it is necessary to design the configuration of each lens unit, especially the configuration of the first lens unit appropriately.

In addition, to provide back focus long enough to allow to provide a color separating optical system on the image side of the zoom lens, it is necessary to design the refractive power arrangement and the lens configuration in each lens unit appropriately.

In particular, in the case of the above described types of four-unit zoom lenses and five-unit zoom lenses, it is very difficult to enlarge the angle of view and increase the zoom ratio while achieving excellent optical performance throughout the zoom range unless the lens configuration of the first lens unit is appropriately designed.

SUMMARY OF THE INVENTION

An object of the present invention is to provide a zoom lens having a wide angle of view and a high zoom ratio in which excellent optical performance is easily achieved throughout the entire zoom range and to provide an image pickup apparatus equipped with such a zoom lens.

A zoom lens according to one aspect of the present invention comprises, in the following order from the object side to the image side, a positive first lens unit, a negative second lens unit, which moves during zooming, a positive third lens unit, and a positive fourth lens unit, which moves during zooming, wherein the first lens unit includes a negative lens subunit and a positive lens subunit, the negative lens subunit includes at least two negative lenses each having a concave surface facing the image side and at least one positive lens arranged in the mentioned order from the object side, and the positive lens subunit includes at least one biconvex positive lens, a negative lens and at least two positive lenses arranged in the mentioned order from the object side, or at least one biconvex positive lens, a cemented lens composed of a negative lens and a positive lens and at least one positive lens arranged in the mentioned order from the object side.

A zoom lens according to another aspect of the present invention comprises, in the following order from the object side to the image side, a positive first lens unit, a negative second lens unit, which moves during zooming, a positive third lens unit, and a positive fourth lens unit, which moves during zooming, wherein the first lens unit includes a negative lens subunit and a positive lens subunit, the negative lens subunit includes at least two negative lenses each having a concave surface facing the image side and at least one positive lens, and said positive lens subunit includes at least three positive lenses and at least one negative lens, or at least two positive lenses and a cemented lens composed of a negative lens and a positive lens.

A zoom lens according to still another aspect of the present invention comprises, in the following order from the object side to the image side, a positive first lens unit, a negative second lens unit, which moves during zooming, a positive third lens unit, and a positive fourth lens unit, which moves during zooming, wherein the first lens unit includes a negative lens subunit and a positive lens subunit, the negative lens subunit includes two negative lenses each having a concave surface facing the image side and a biconvex positive lens, the absolute value of the refractive power of the image side surface of the biconvex positive lens being larger than the absolute value of the refractive power of the object side surface of the same biconvex positive lens, and the positive lens subunit includes a biconvex positive lens, a negative lens or a cemented lens composed of a negative lens and a positive lens, and a positive lens having a convex surface facing the object side, the absolute value of the refractive power of the object side surface of the last mentioned positive lens being larger than the absolute value of the refractive power of the image side surface of the same positive lens.

A zoom lens according to a further aspect of the present invention comprises, in the following order from the object side to the image side, a positive first lens unit, a negative second lens unit, which moves during zooming, a positive third lens unit, and a positive fourth lens unit, which moves during zooming, wherein the first lens unit includes a negative lens subunit and a positive lens subunit, the negative lens subunit includes two negative lenses each having a concave surface facing the image side and a biconvex positive lens, the absolute value of the refractive power of the image side surface of the biconvex positive lens being larger than the absolute value of the refractive power of the object side surface of the same biconvex positive lens, and the positive lens subunit includes a biconvex positive lens, a negative lens having a concave surface facing the image side or a cemented lens composed of a negative lens having a concave surface facing the image side and a positive lens, and two positive lenses each having a convex surface facing the object side.

Further features of the present invention will become apparent from the following description of exemplary embodiments with reference to the attached drawings.

DESCRIPTION OF THE EMBODIMENTS

In the following, a zoom lens and an image pickup apparatus equipped with the zoom lens according to an embodiment of the present invention will be described.

Figure 1:
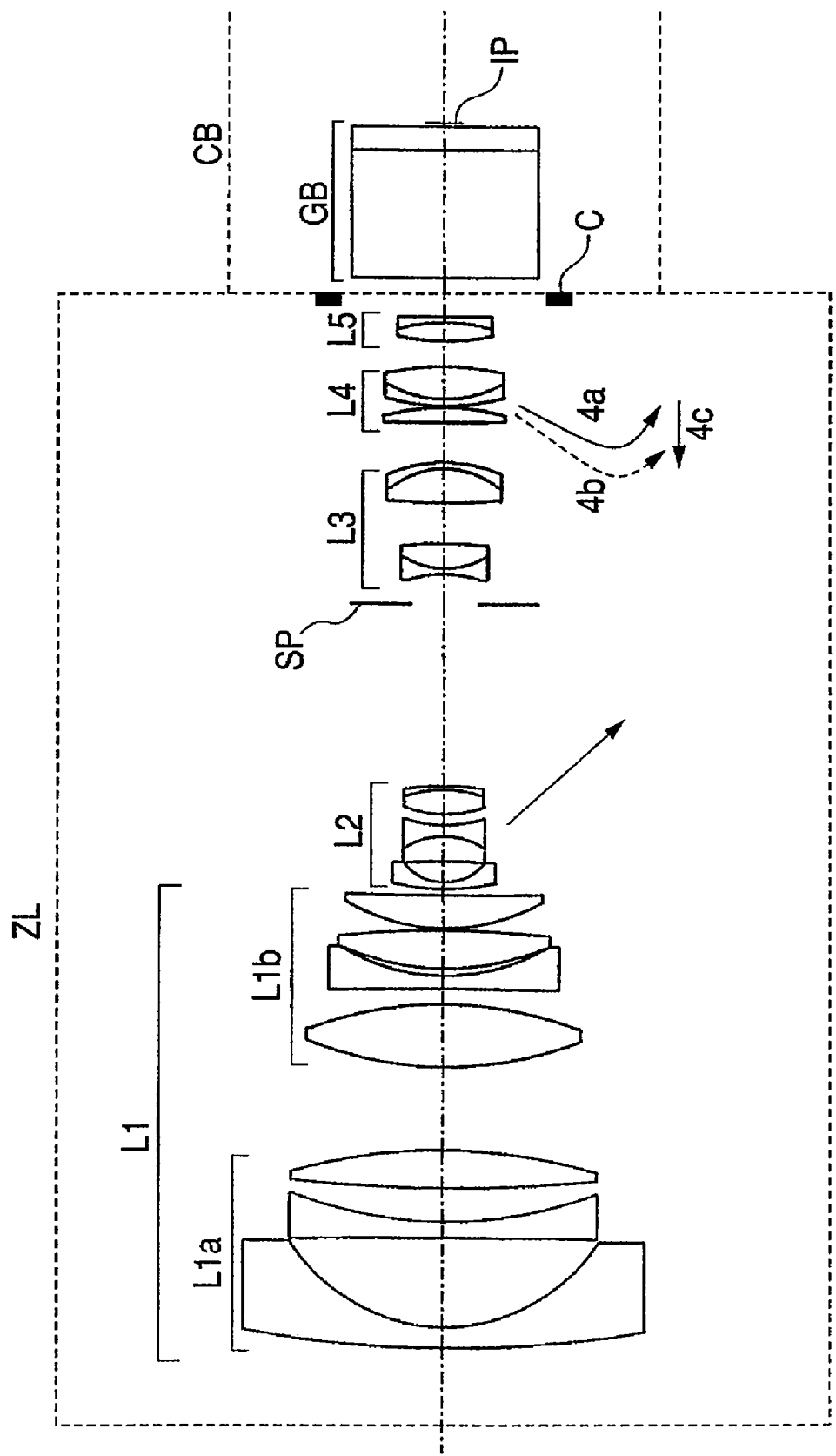
FIG. 1 is a cross sectional view of a zoom lens according to a first embodiment.
Figure 2:
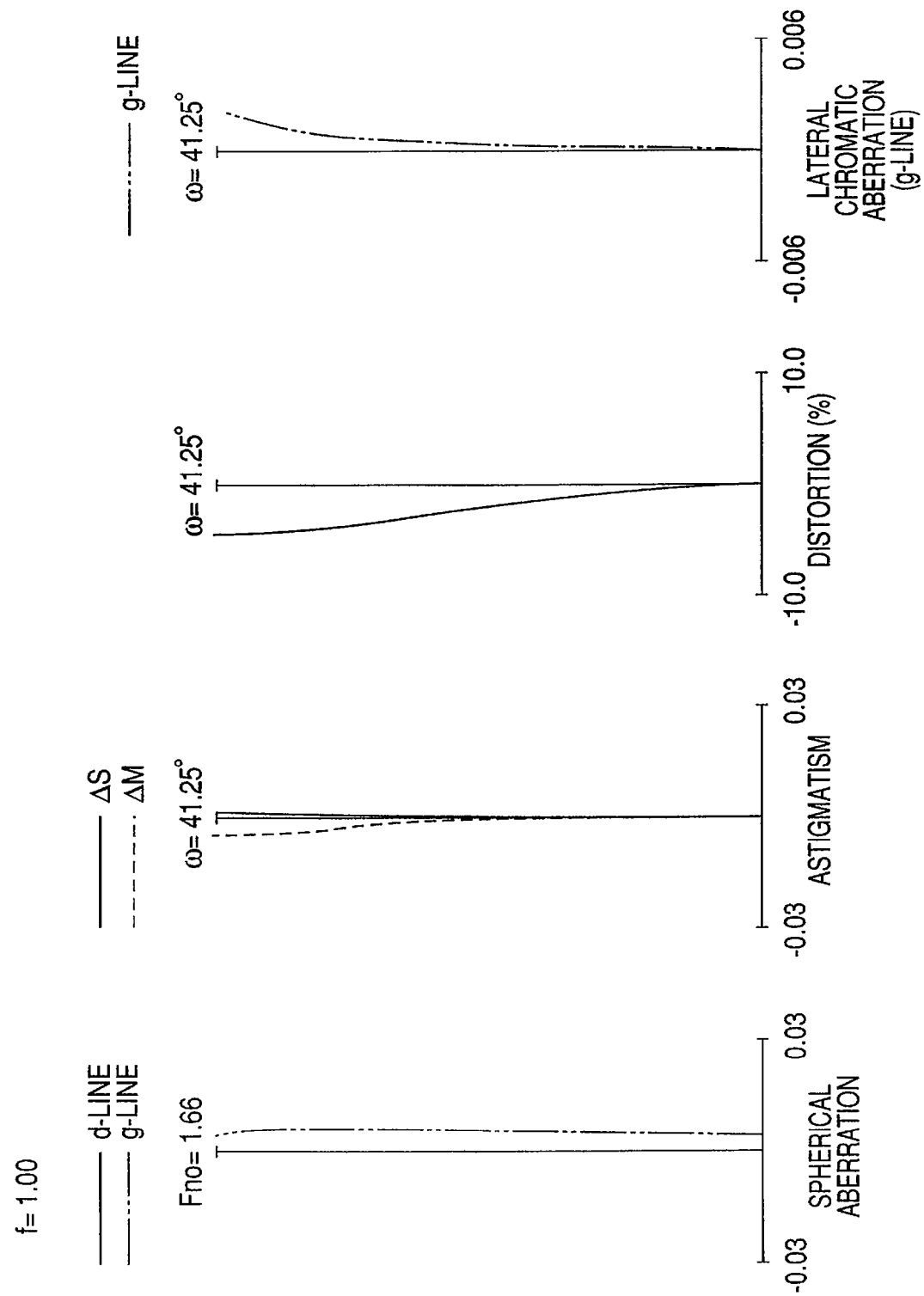
FIG. 2 shows aberration diagrams for a numerical embodiment corresponding to the first embodiment at the wide angle end.
Figure 3:
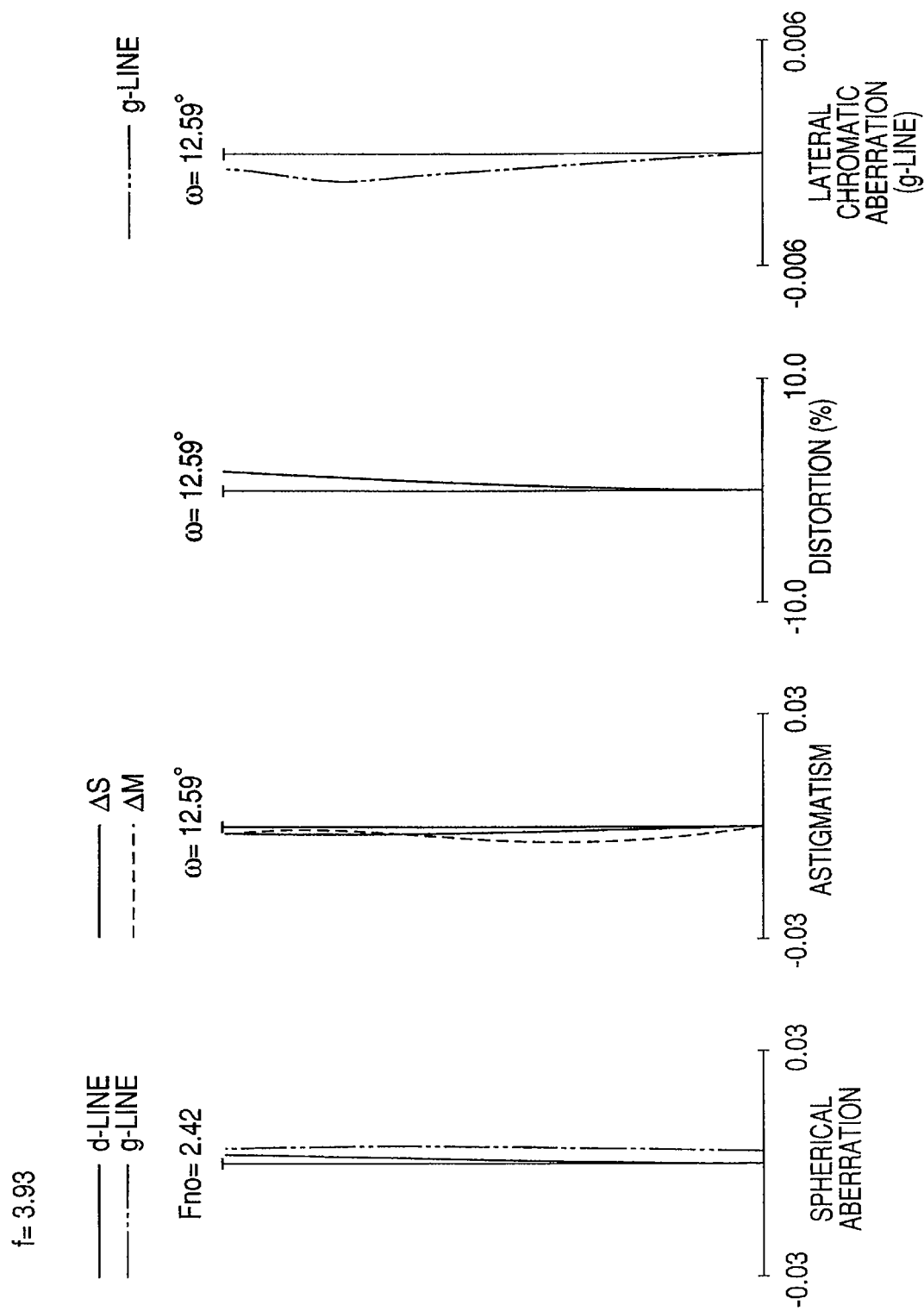
FIG. 3 shows aberration diagrams for the numerical embodiment according to the first embodiment at an intermediate zoom position.
Figure 4:
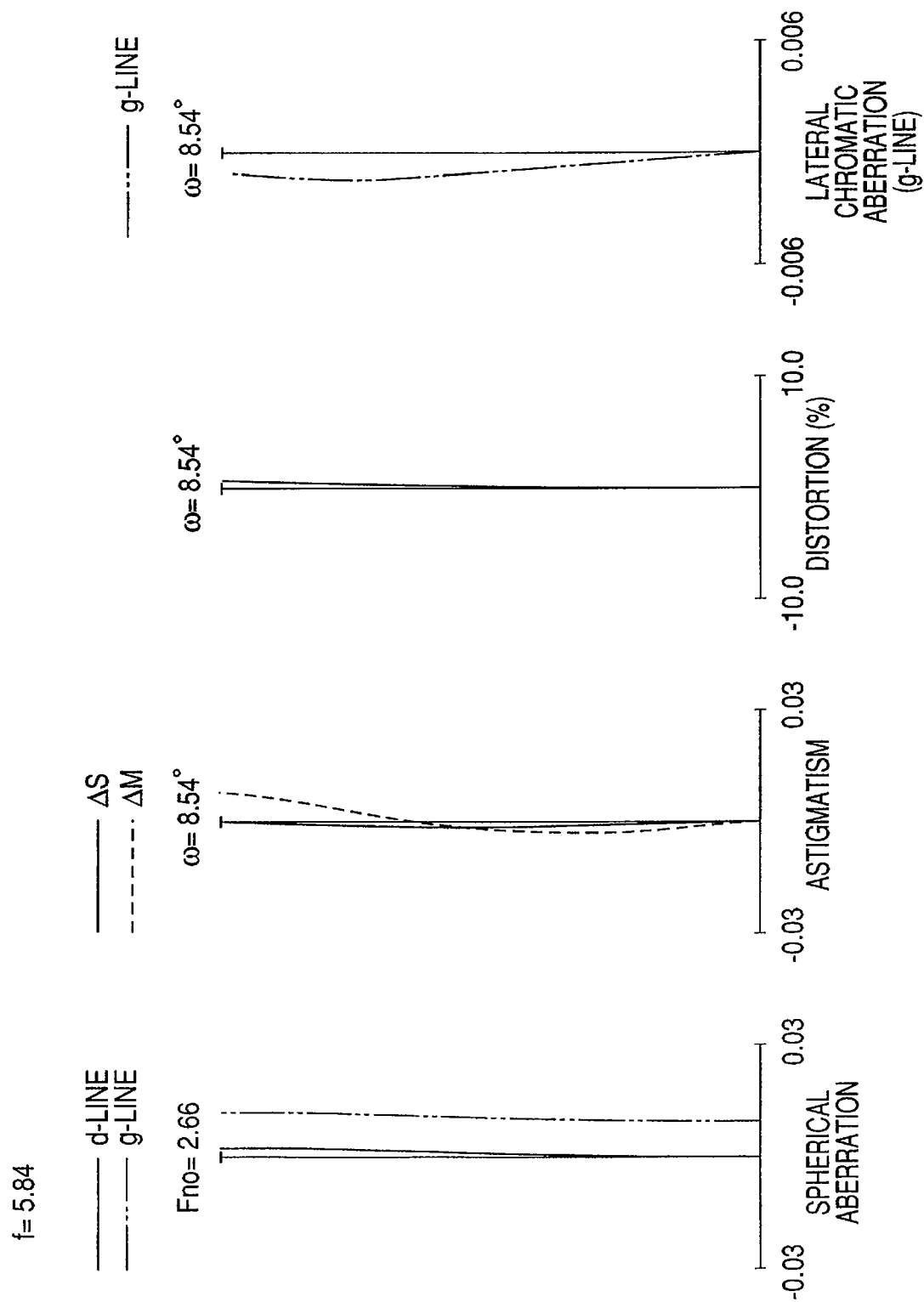
FIG. 4 shows aberration diagrams for the numerical embodiment according to the first embodiment at the telephoto end.

FIG. 1 is a cross sectional view showing the lens configuration of a zoom lens according to the first embodiment of the present invention at the wide angle end (i.e. at the shortest focal length zoom position). FIGS. 2, 3 and 4 show aberrations of the zoom lens according to the first embodiment respectively at the wide angle end, at an intermediate zoom position and at the telephoto end (i.e. at the longest focal length zoom position).

Figure 5:
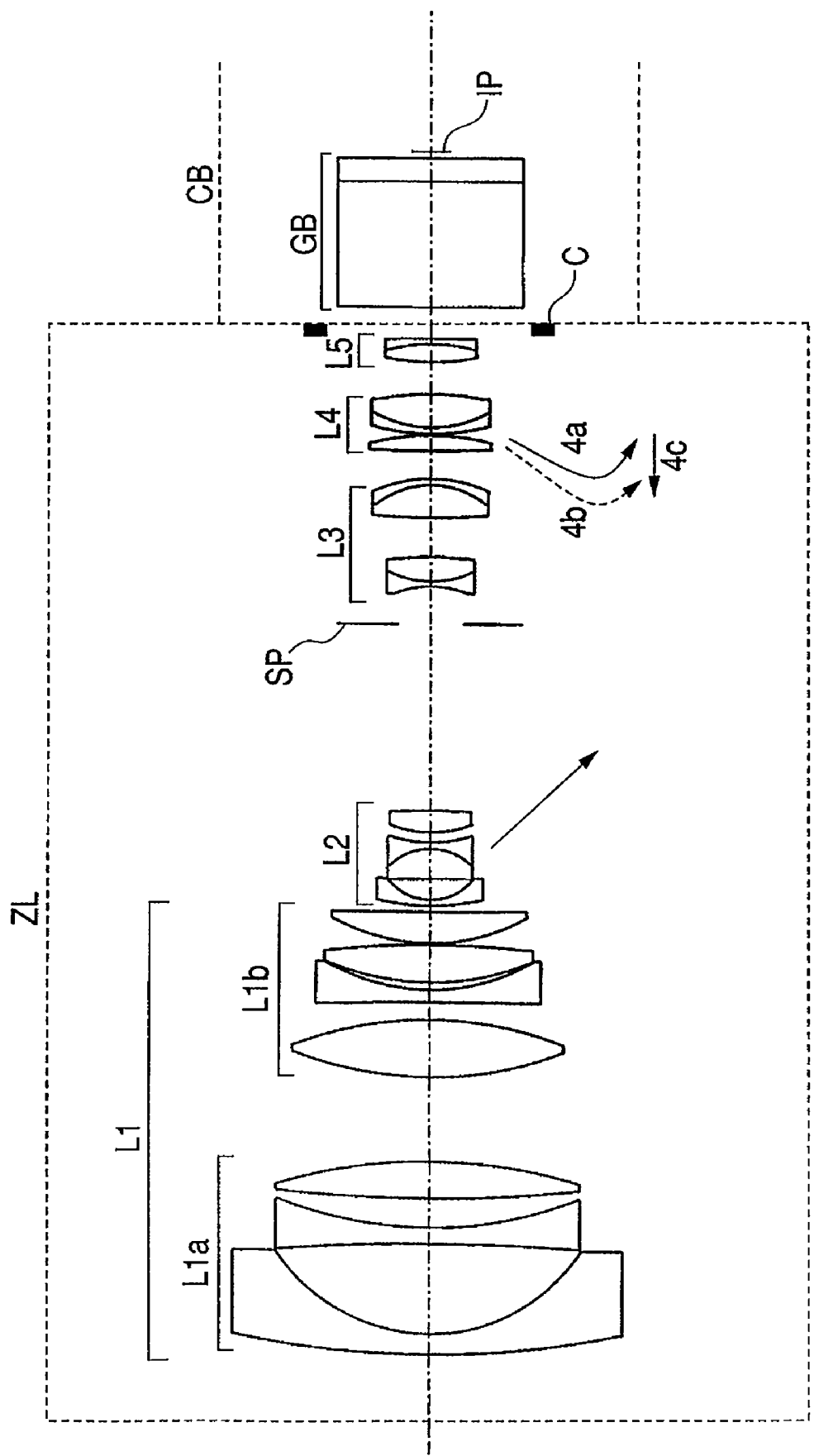
FIG. 5 is a cross sectional view of a zoom lens according to a second embodiment.
Figure 6:
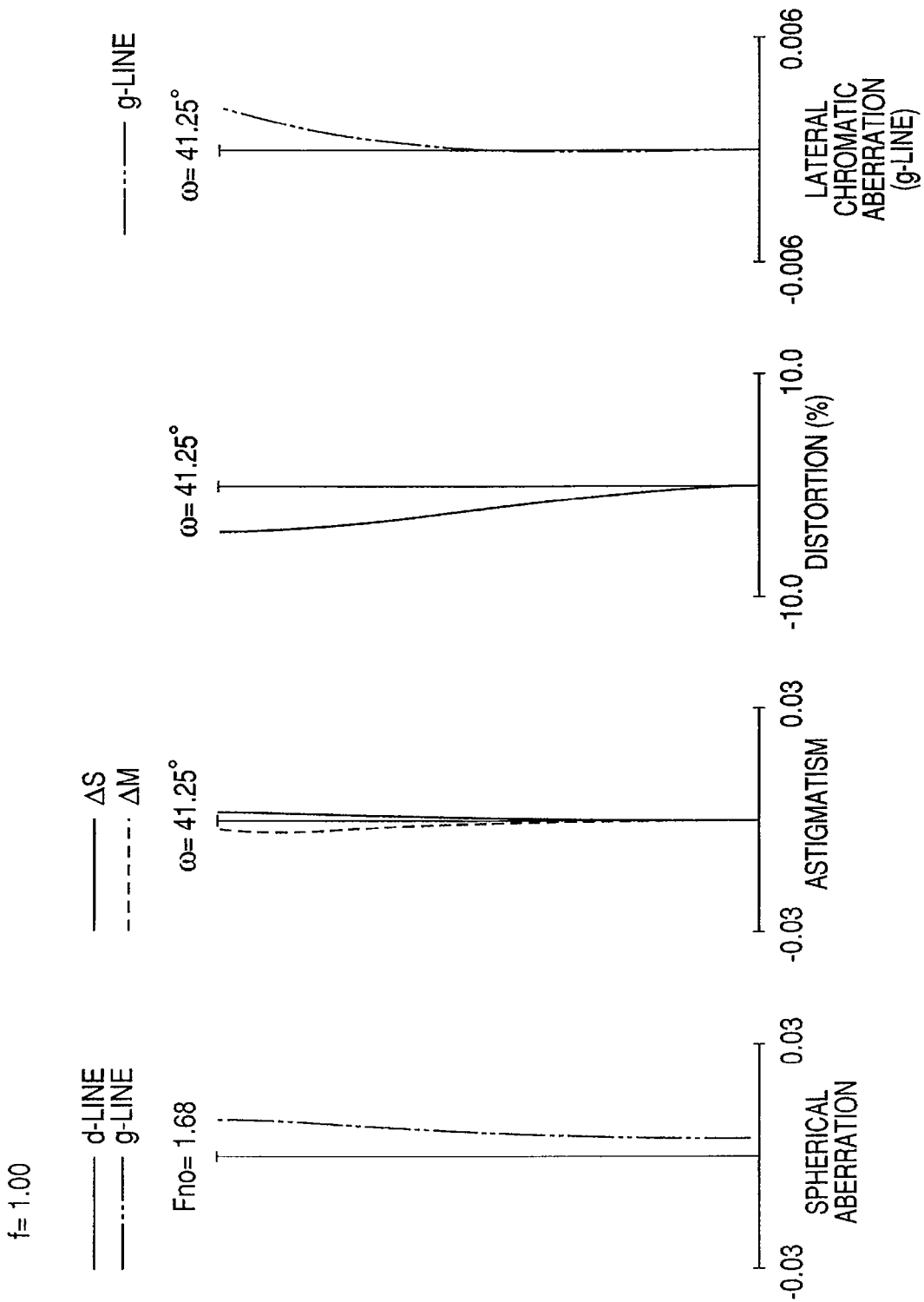
FIG. 6 shows aberration diagrams for a numerical embodiment corresponding to the second embodiment at the wide angle end.
Figure 7:
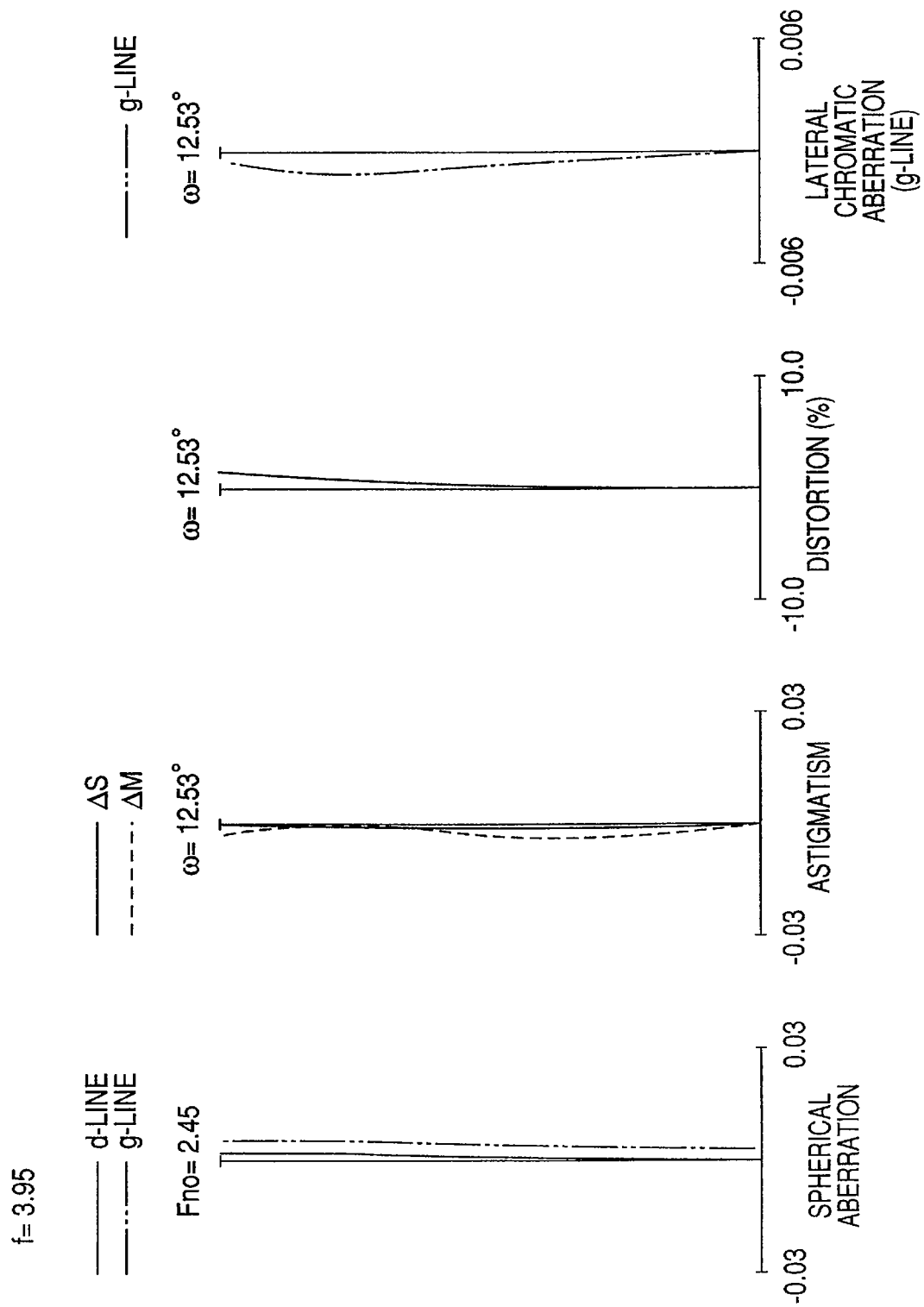
FIG. 7 shows aberration diagrams for the numerical embodiment according to the second embodiment at an intermediate zoom position.
Figure 8:
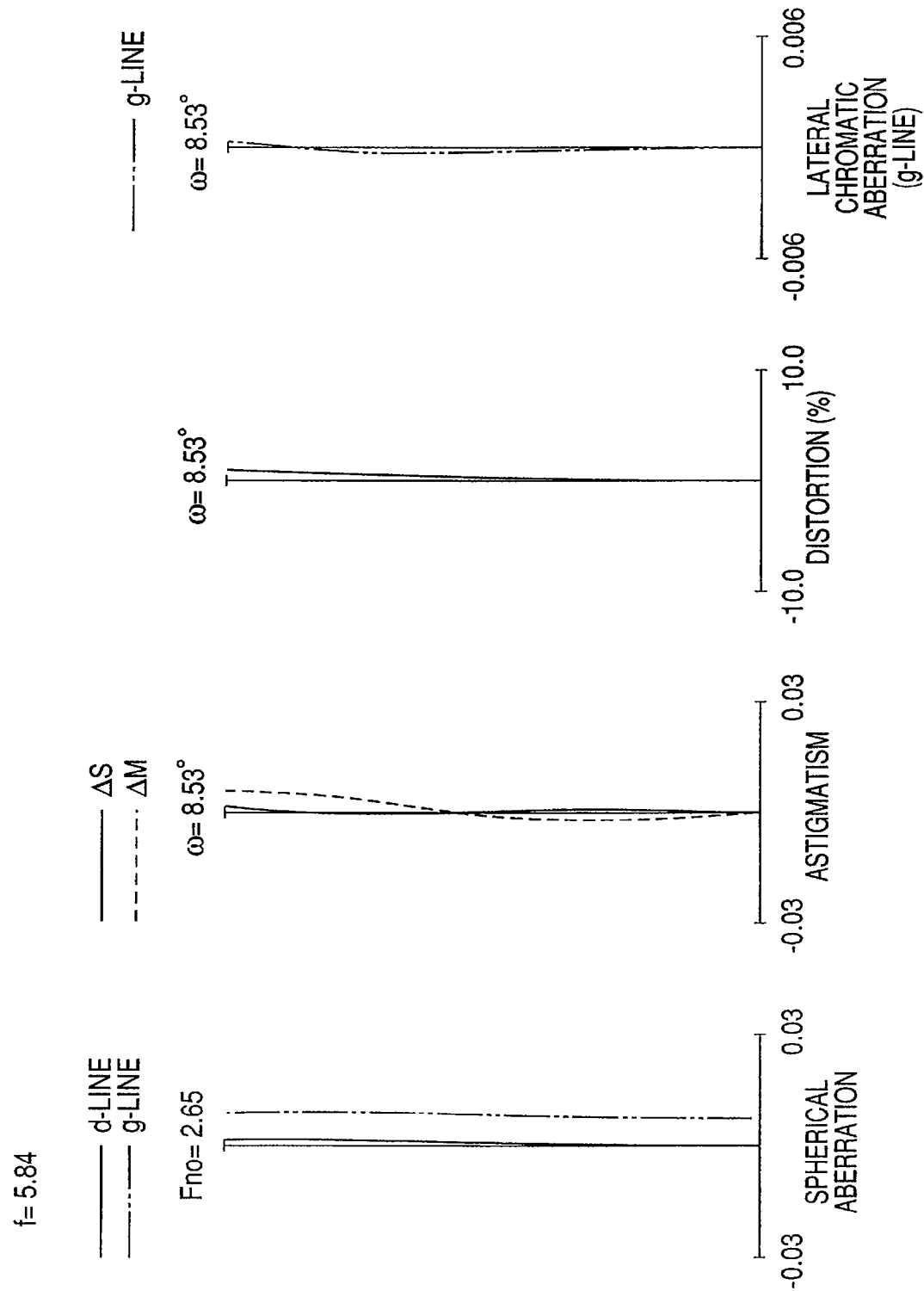
FIG. 8 shows aberration diagrams for the numerical embodiment according to the second embodiment at the telephoto end.

FIG. 5 is a cross sectional view showing the lens configuration of a zoom lens according to the second embodiment of the present invention at the wide angle end. FIGS. 6, 7 and 8 show aberrations of the zoom lens according to the second embodiment respectively at the wide angle end, at an intermediate zoom position and at the telephoto end.

Figure 9:
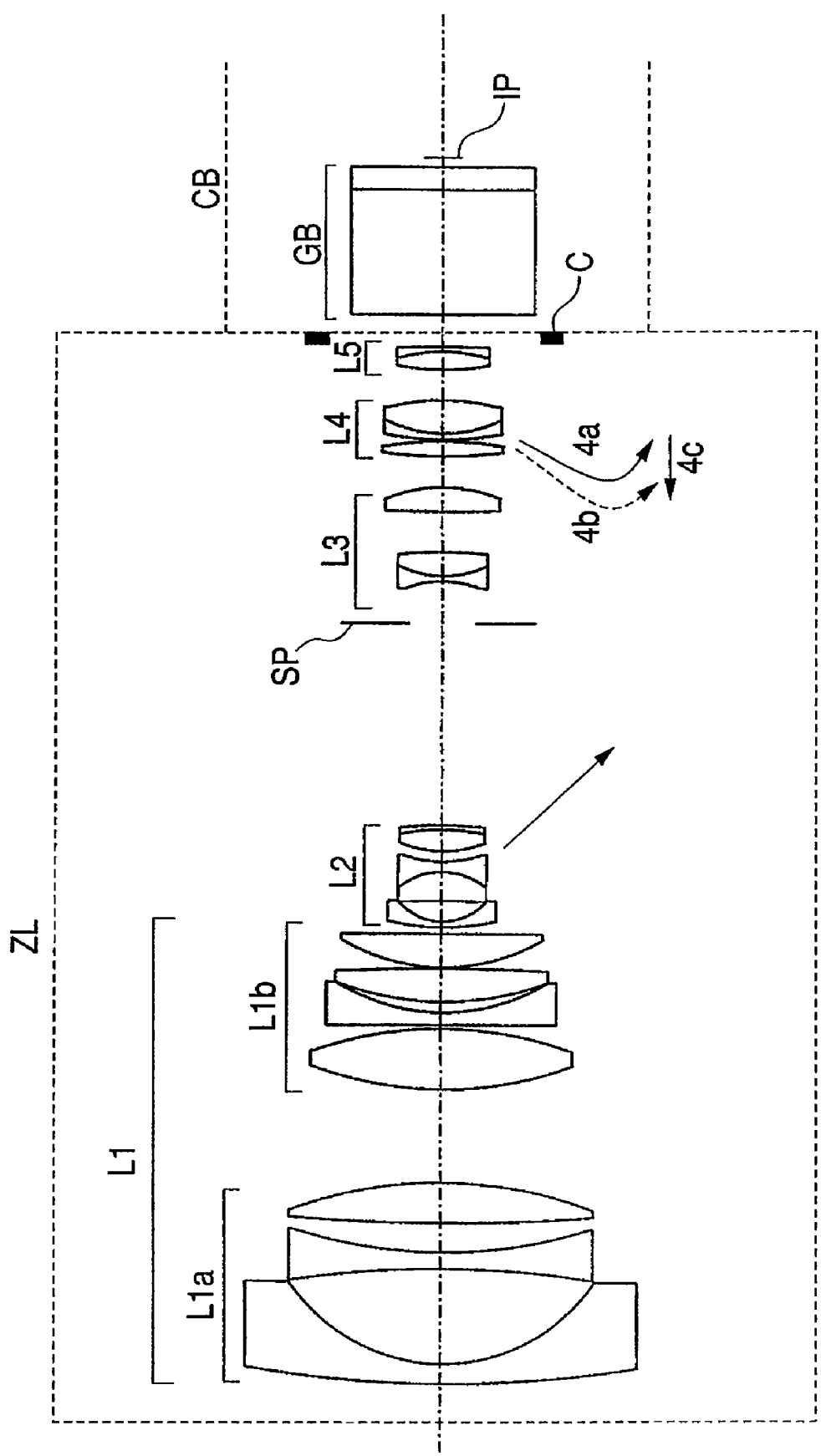
FIG. 9 is a cross sectional view of a zoom lens according to a third embodiment.
Figure 10:
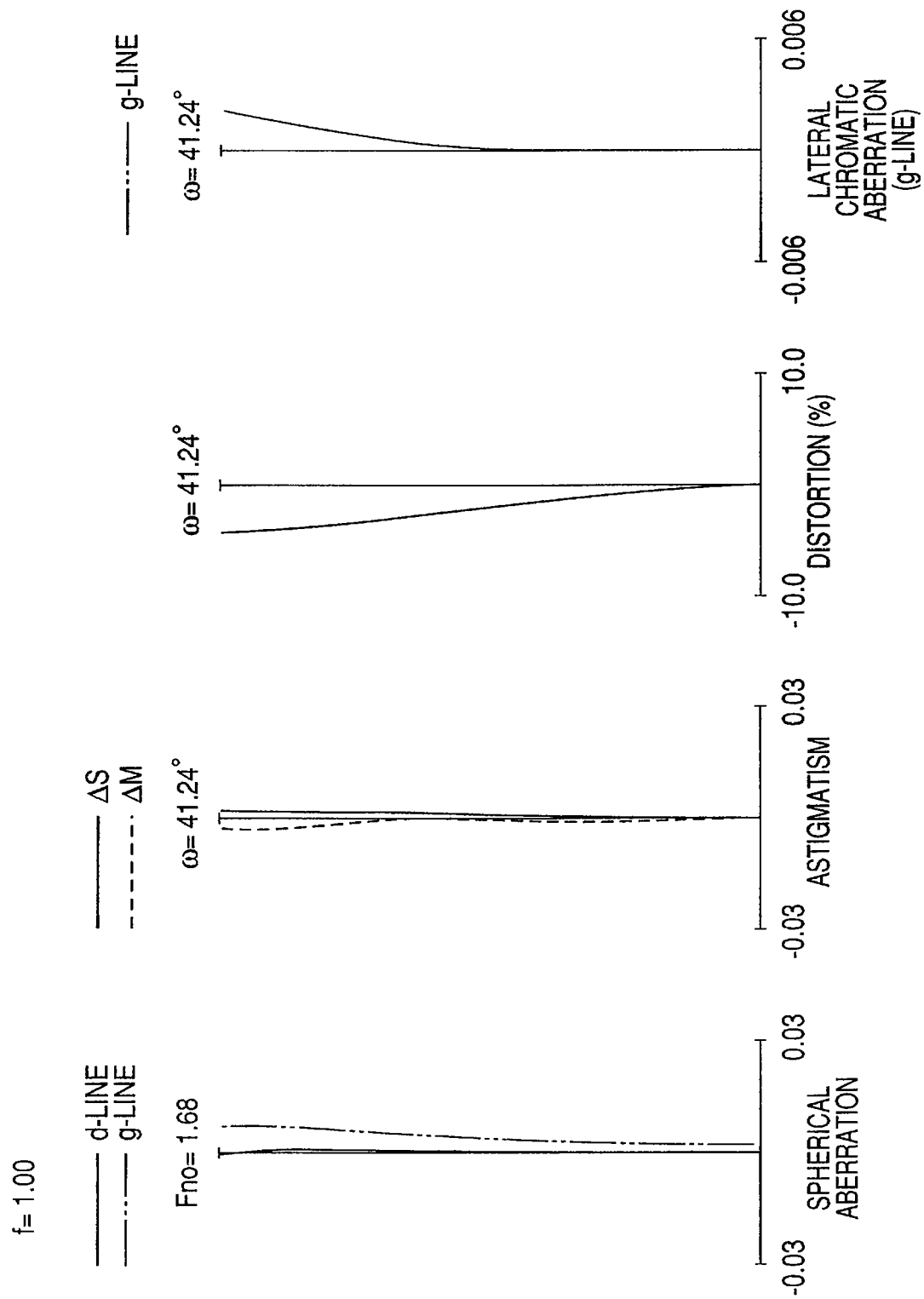
FIG. 10 shows aberration diagrams for a numerical embodiment corresponding to the third embodiment at the wide angle end.
Figure 11:
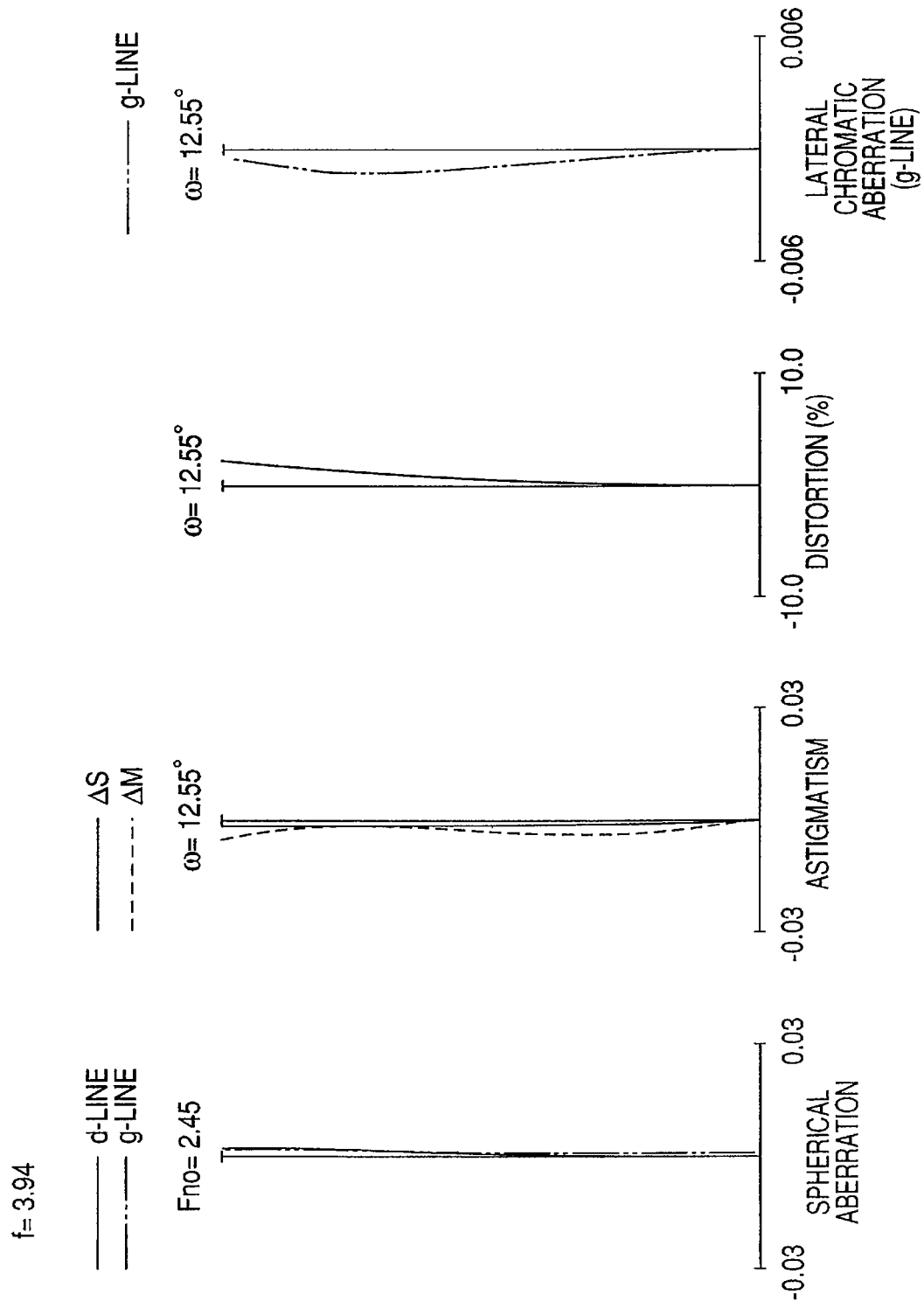
FIG. 11 shows aberration diagrams for the numerical embodiment according to the third embodiment at an intermediate zoom position.
Figure 12:
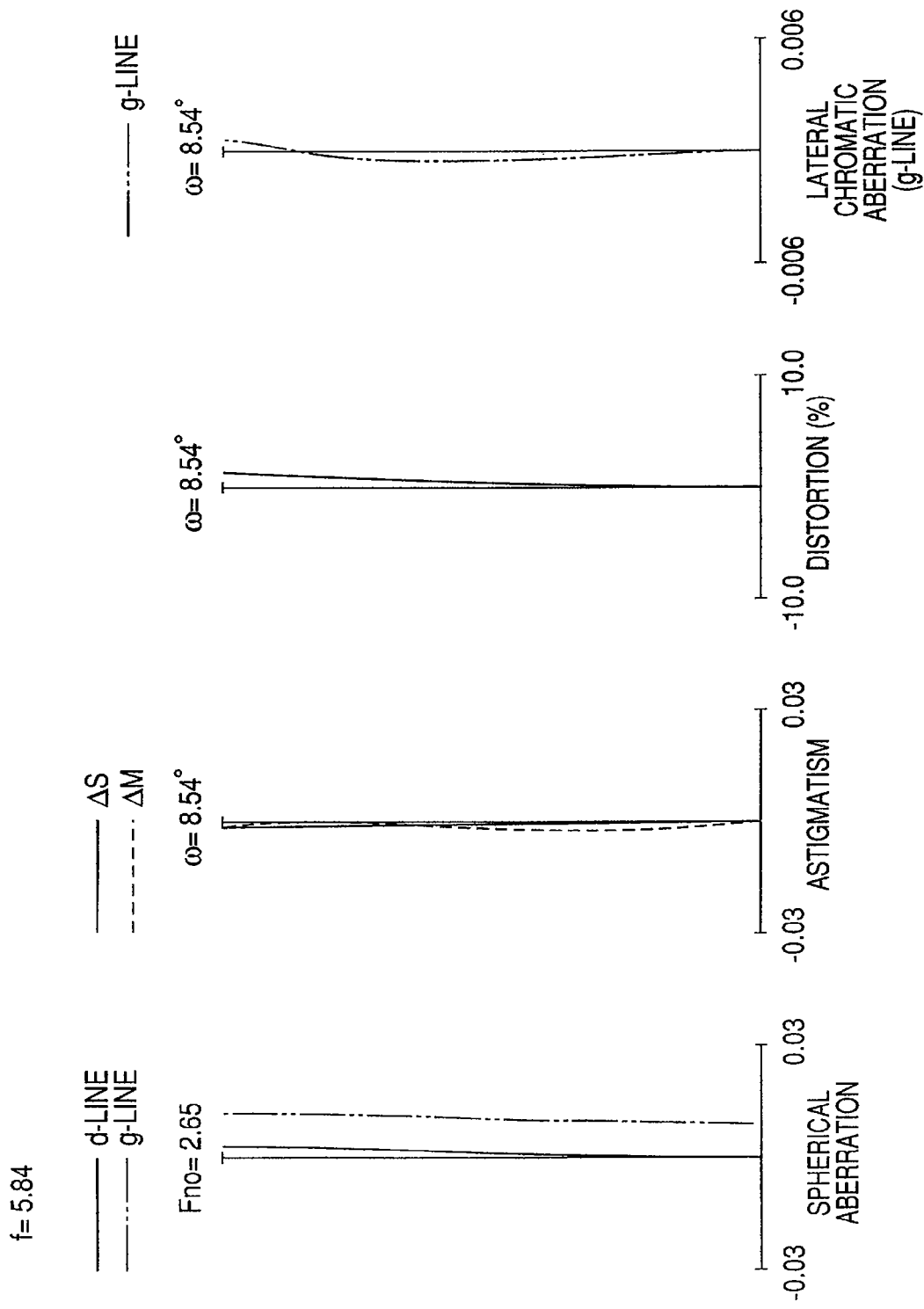
FIG. 12 shows aberration diagrams for the numerical embodiment according to the third embodiment at the telephoto end.

FIG. 9 is a cross sectional view showing the lens configuration of a zoom lens according to the third embodiment of the present invention at the wide angle end. FIGS. 10, 11 and 12 show aberrations of the zoom lens according to the third embodiment respectively at the wide angle end, at an intermediate zoom position and at the telephoto end.

Figure 13:
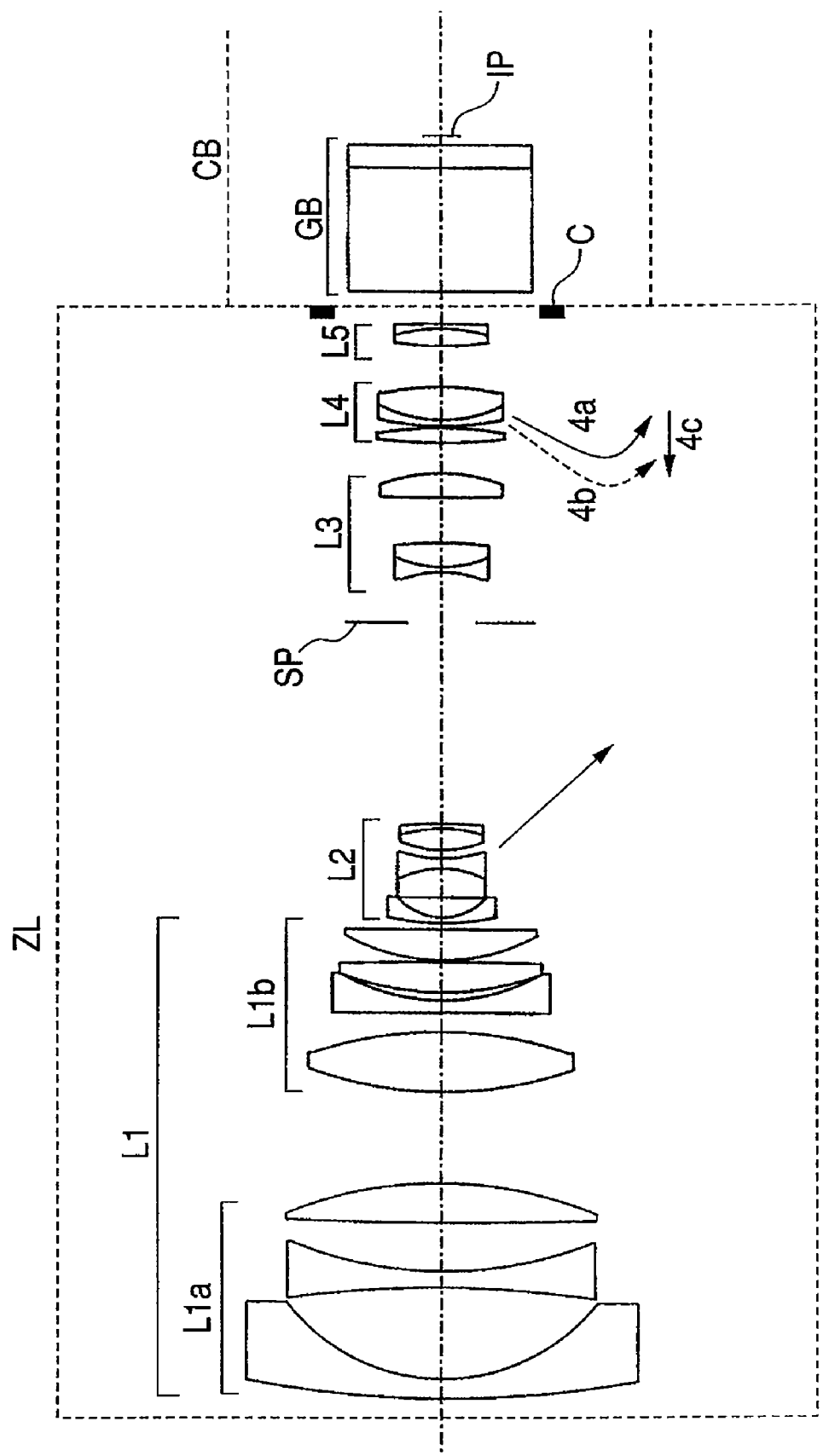
FIG. 13 is a cross sectional view of a zoom lens according to a fourth embodiment.
Figure 14:
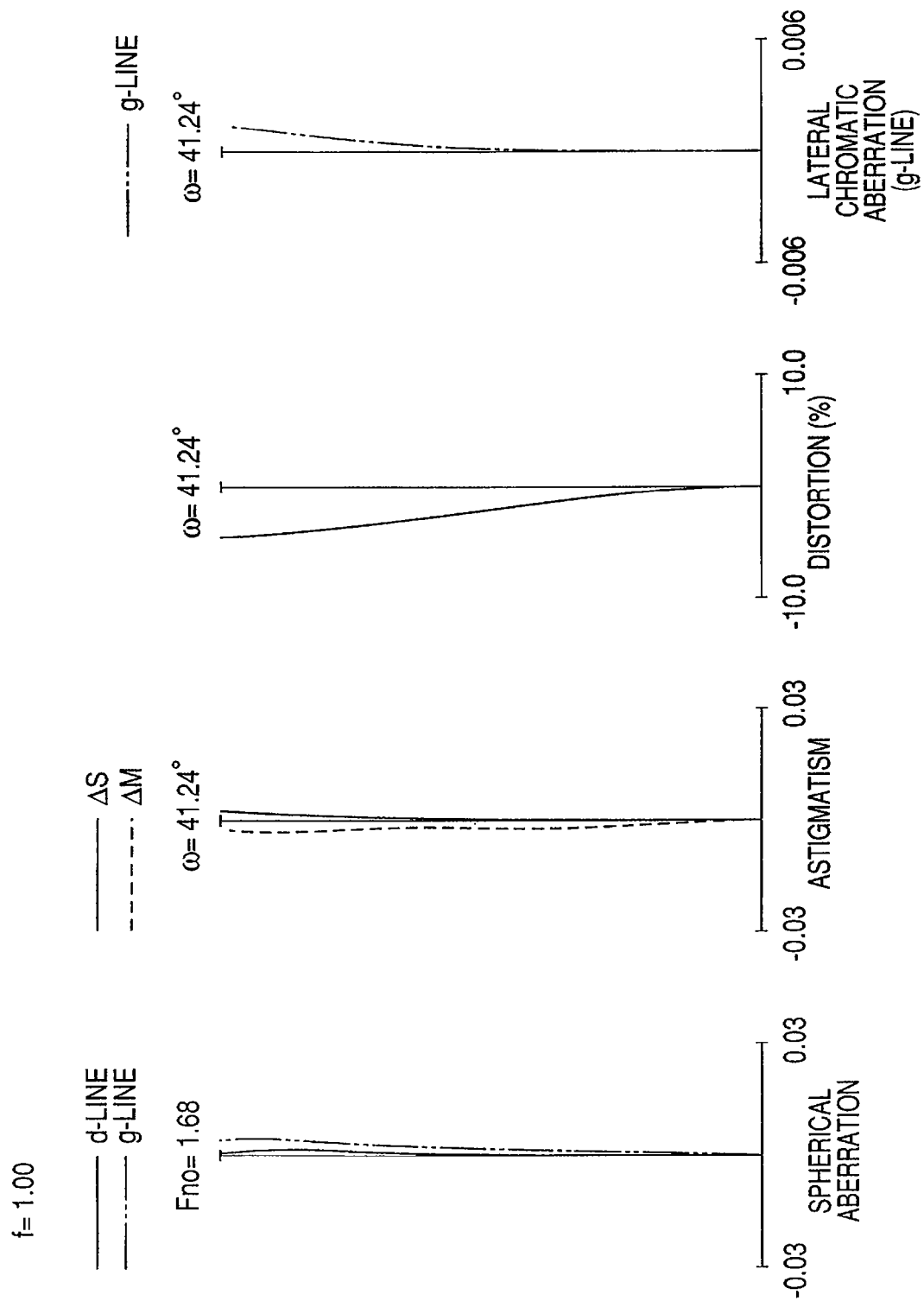
FIG. 14 shows aberration diagrams for a numerical embodiment corresponding to the fourth embodiment at the wide angle end.
Figure 15:
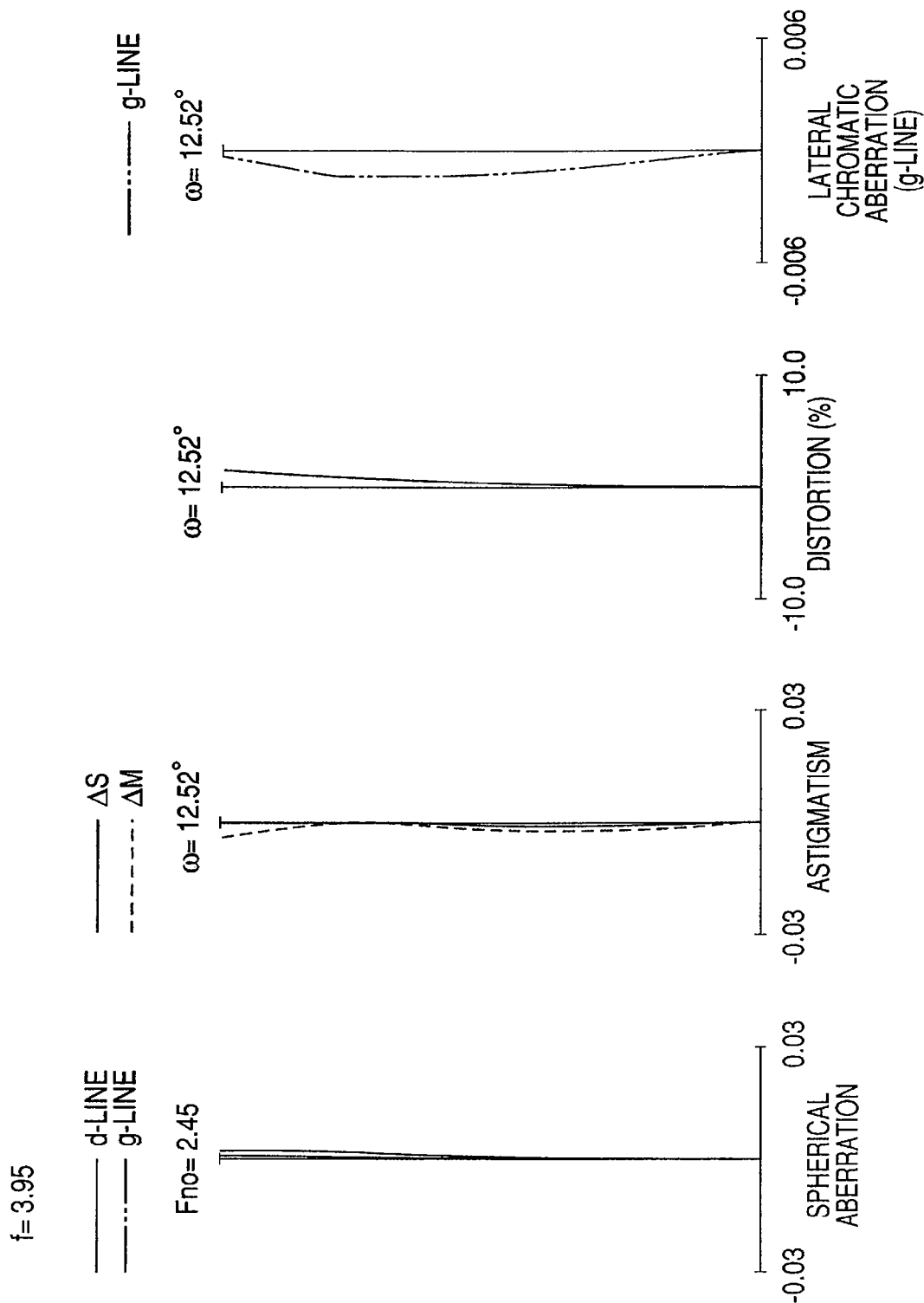
FIG. 15 shows aberration diagrams for the numerical embodiment according to the fourth embodiment at an intermediate zoom position.
Figure 16:
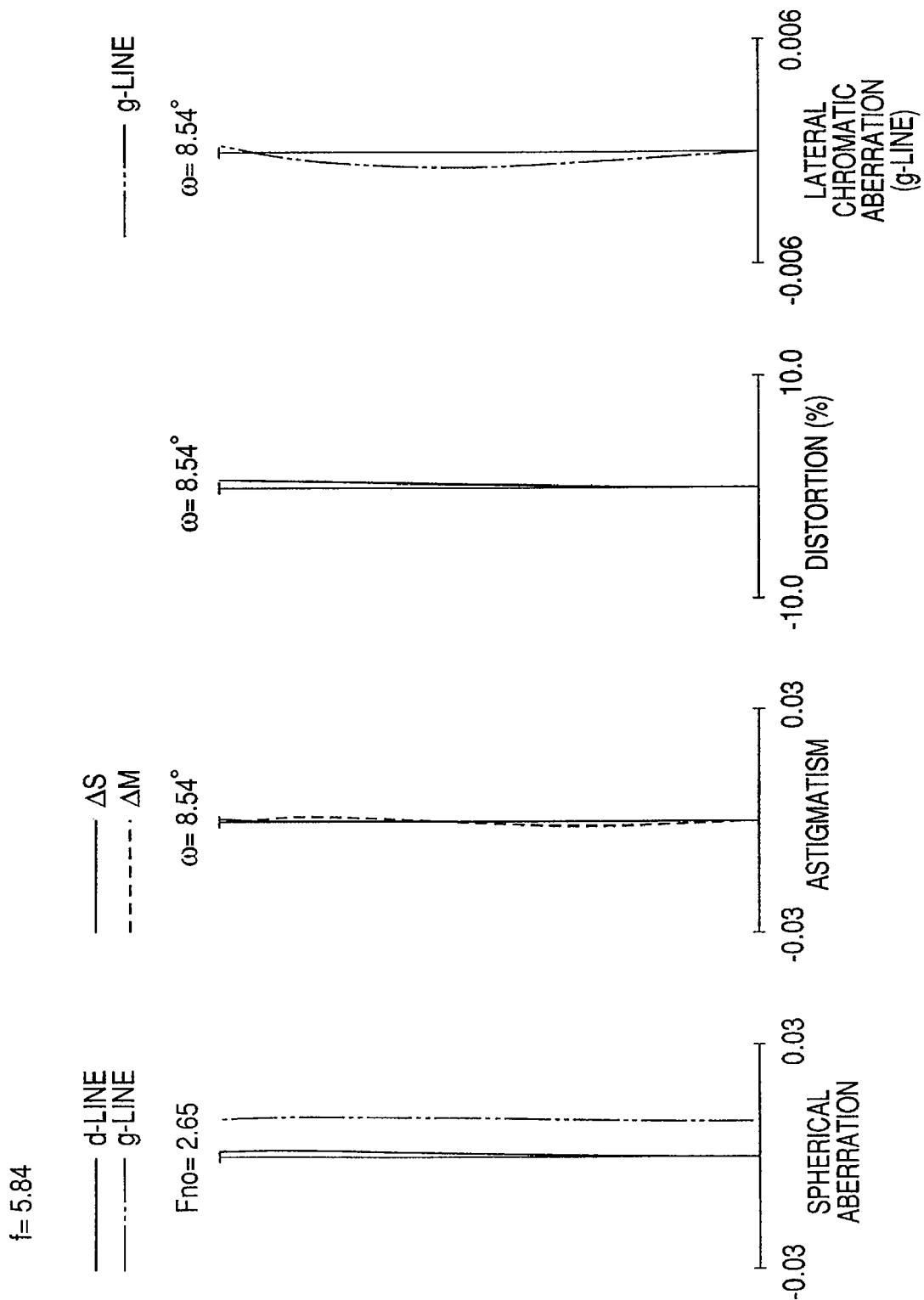
FIG. 16 shows aberration diagrams for the numerical embodiment according to the fourth embodiment at the telephoto end.

FIG. 13 is a cross sectional view showing the lens configuration of a zoom lens according to the fourth embodiment of the present invention at the wide angle end. FIGS. 14, 15 and 16 show aberrations of the zoom lens according to the fourth embodiment respectively at the wide angle end, at an intermediate zoom position and at the telephoto end.

Figure 17:
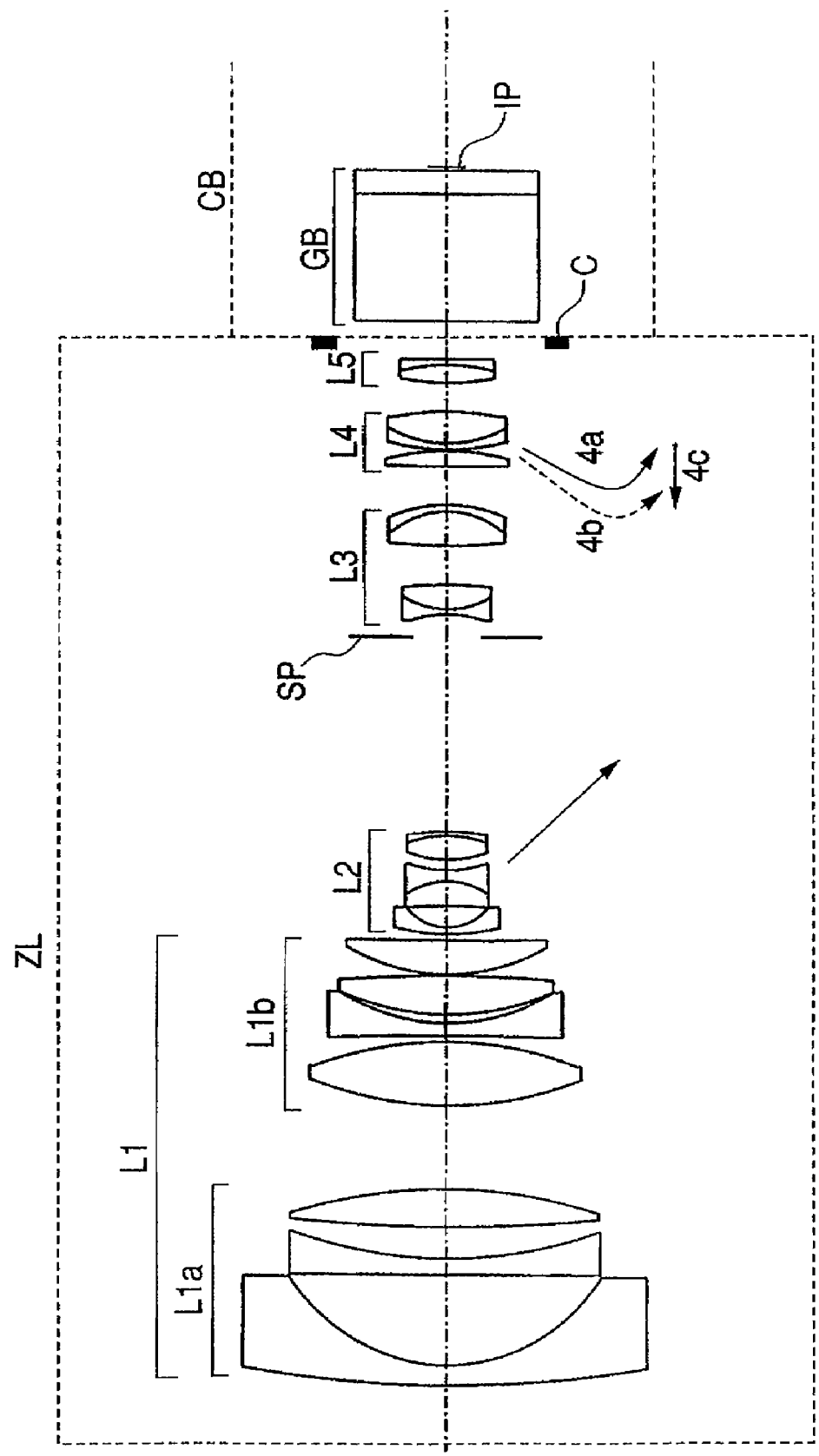
FIG. 17 is a cross sectional view of a zoom lens according to a fifth embodiment.
Figure 18:
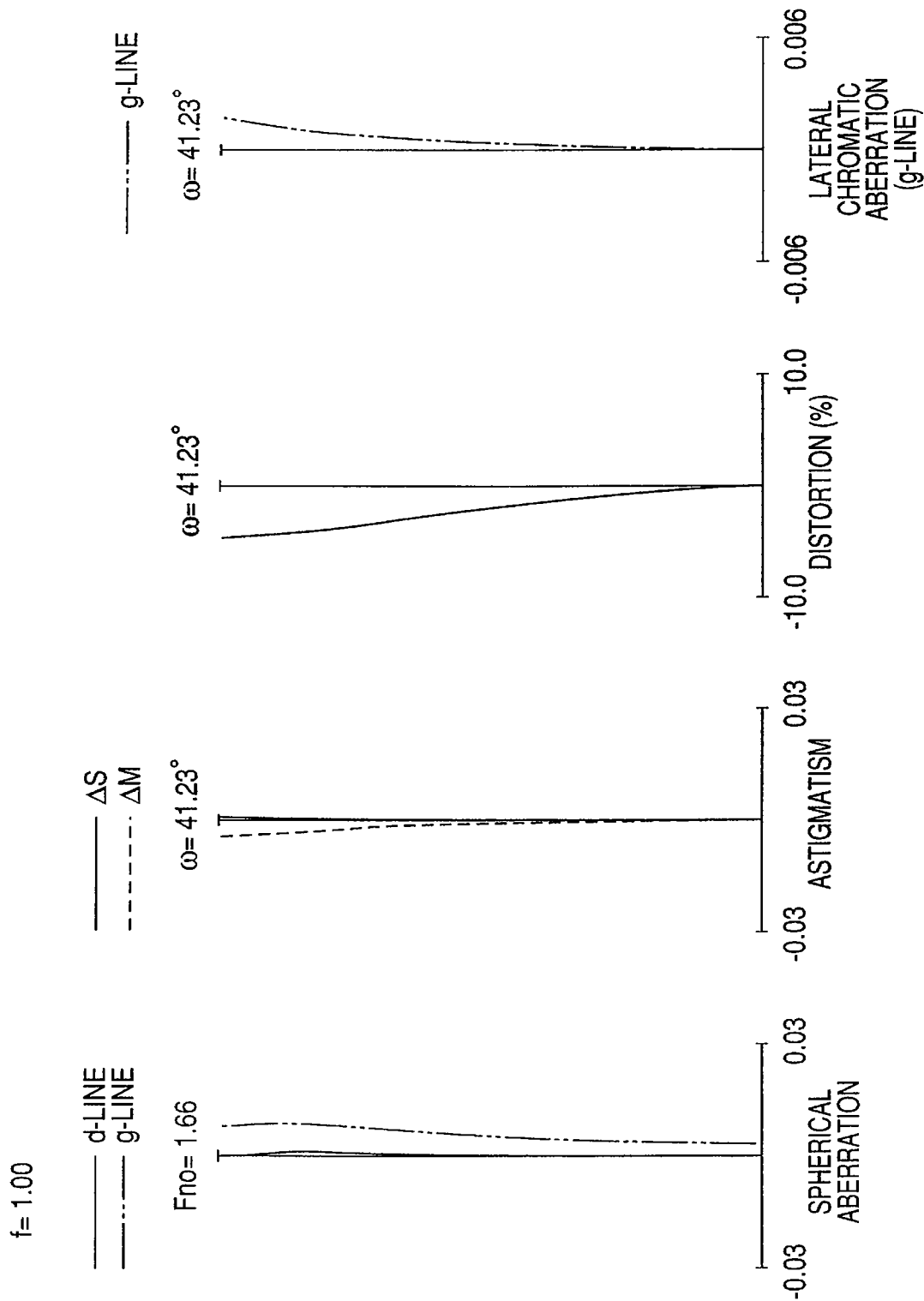
FIG. 18 shows aberration diagrams for a numerical embodiment corresponding to the fifth embodiment at the wide angle end.
Figure 19:
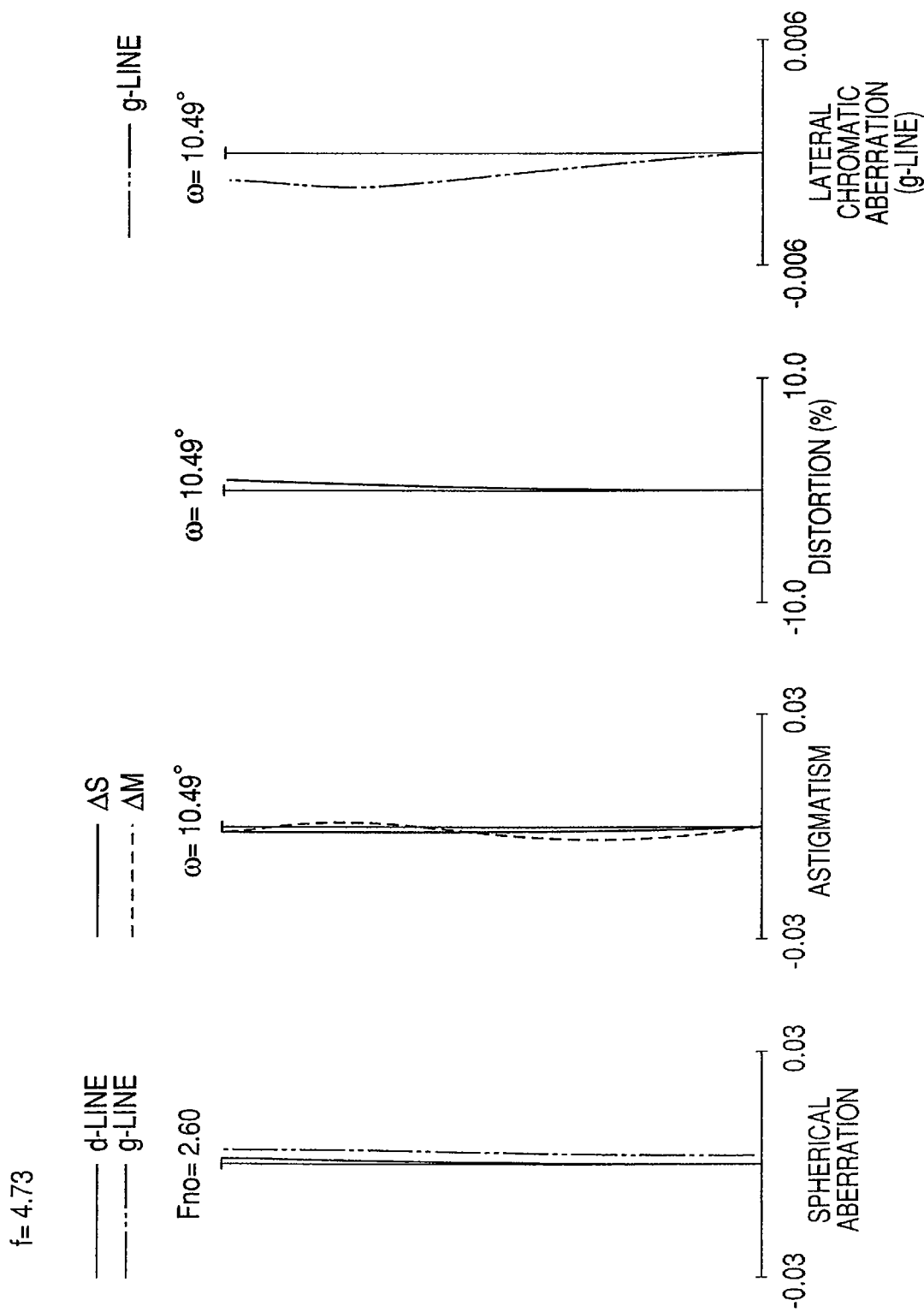
FIG. 19 shows aberration diagrams for the numerical embodiment according to the fifth embodiment at an intermediate zoom position.
Figure 20:
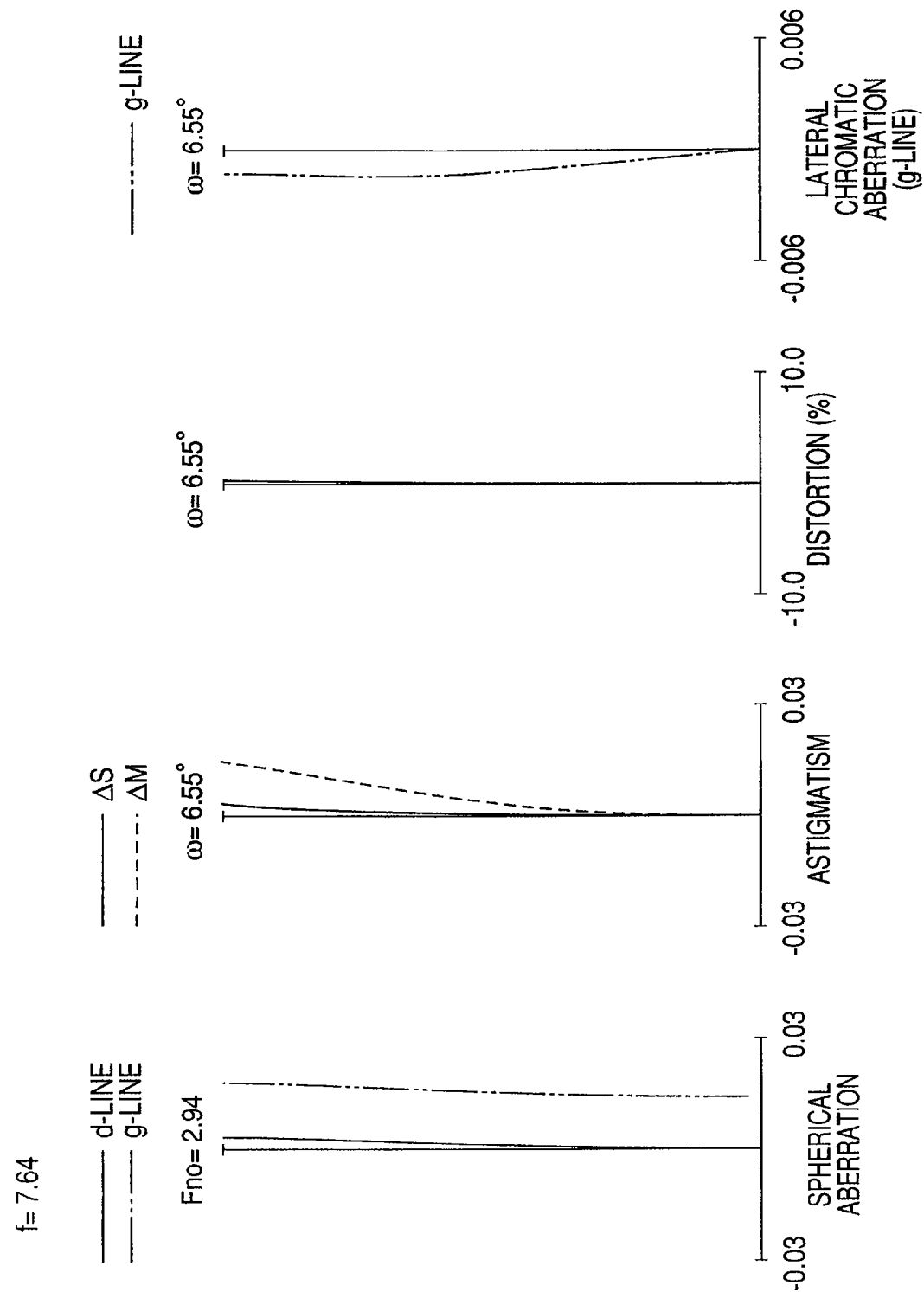
FIG. 20 shows aberration diagrams for the numerical embodiment according to the fifth embodiment at the telephoto end.

FIG. 17 is a cross sectional view showing the lens configuration of a zoom lens according to the fifth embodiment of the present invention at the wide angle end. FIGS. 18, 19 and 20 show aberrations of the zoom lens according to the fifth embodiment respectively at the wide angle end, at an intermediate zoom position and at the telephoto end.

Figure 21:
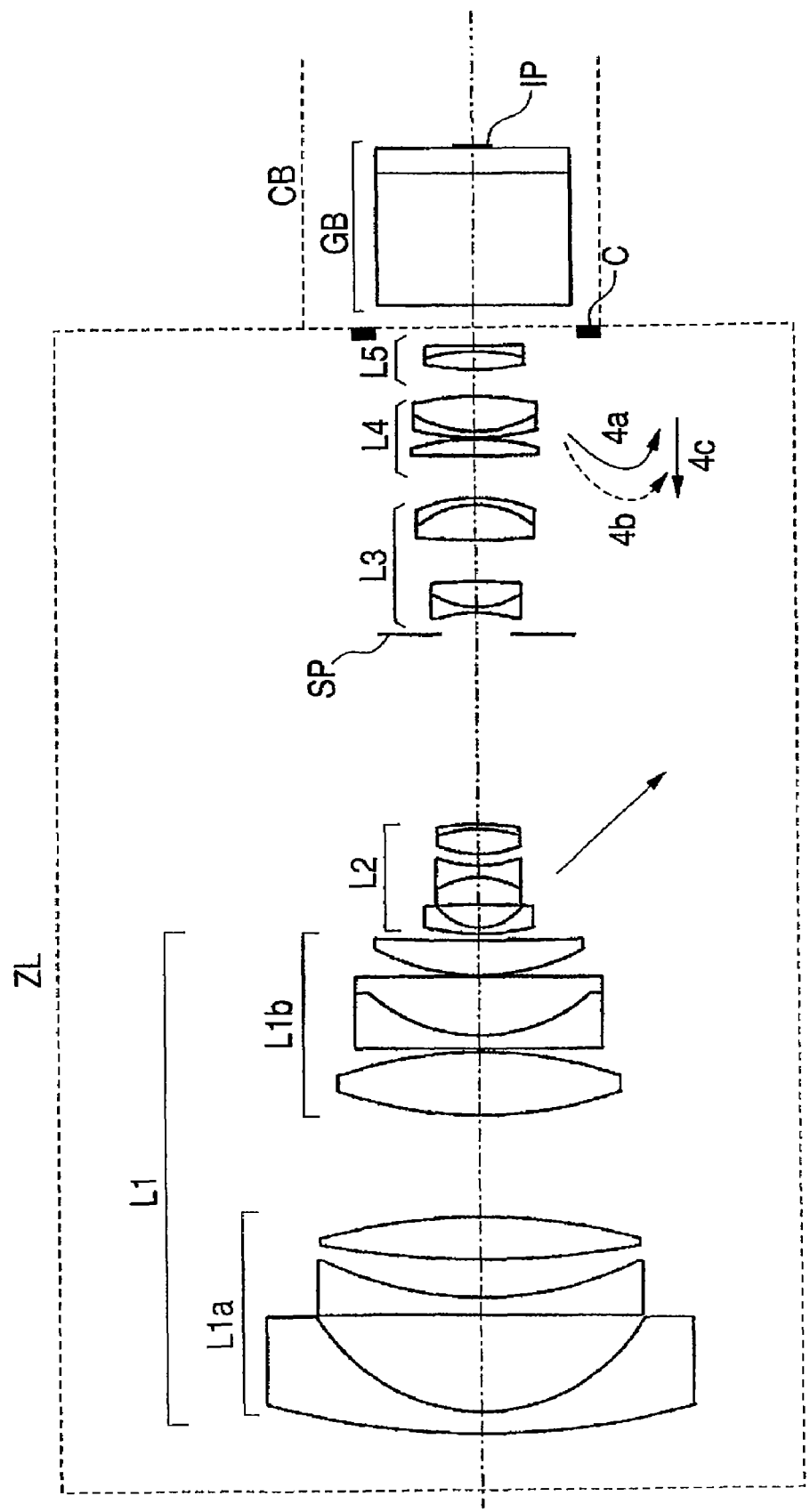
FIG. 21 is a cross sectional view of a zoom lens according to a sixth embodiment.
Figure 22:
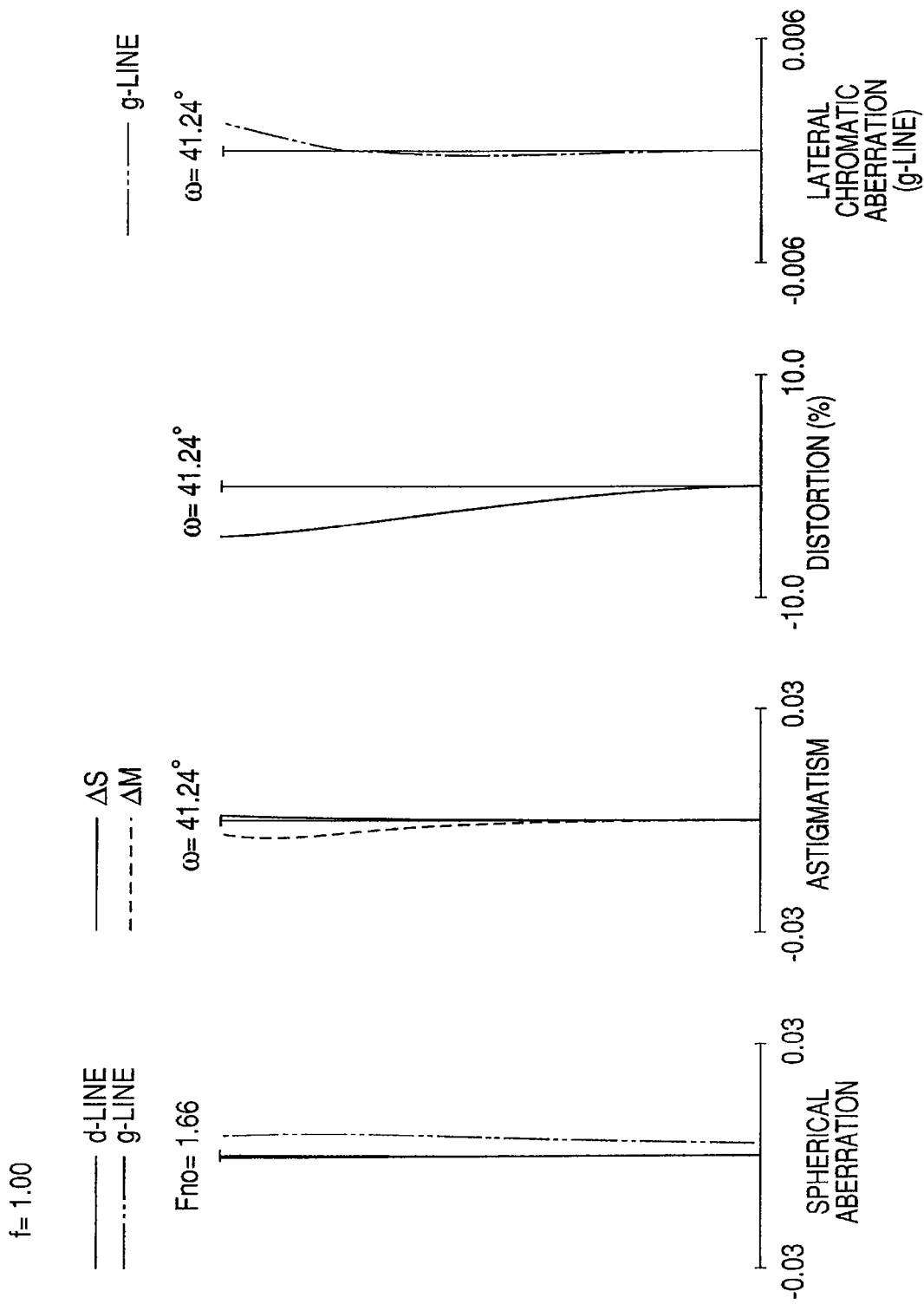
FIG. 22 shows aberration diagrams for a numerical embodiment corresponding to the sixth embodiment at the wide angle end.
Figure 23:
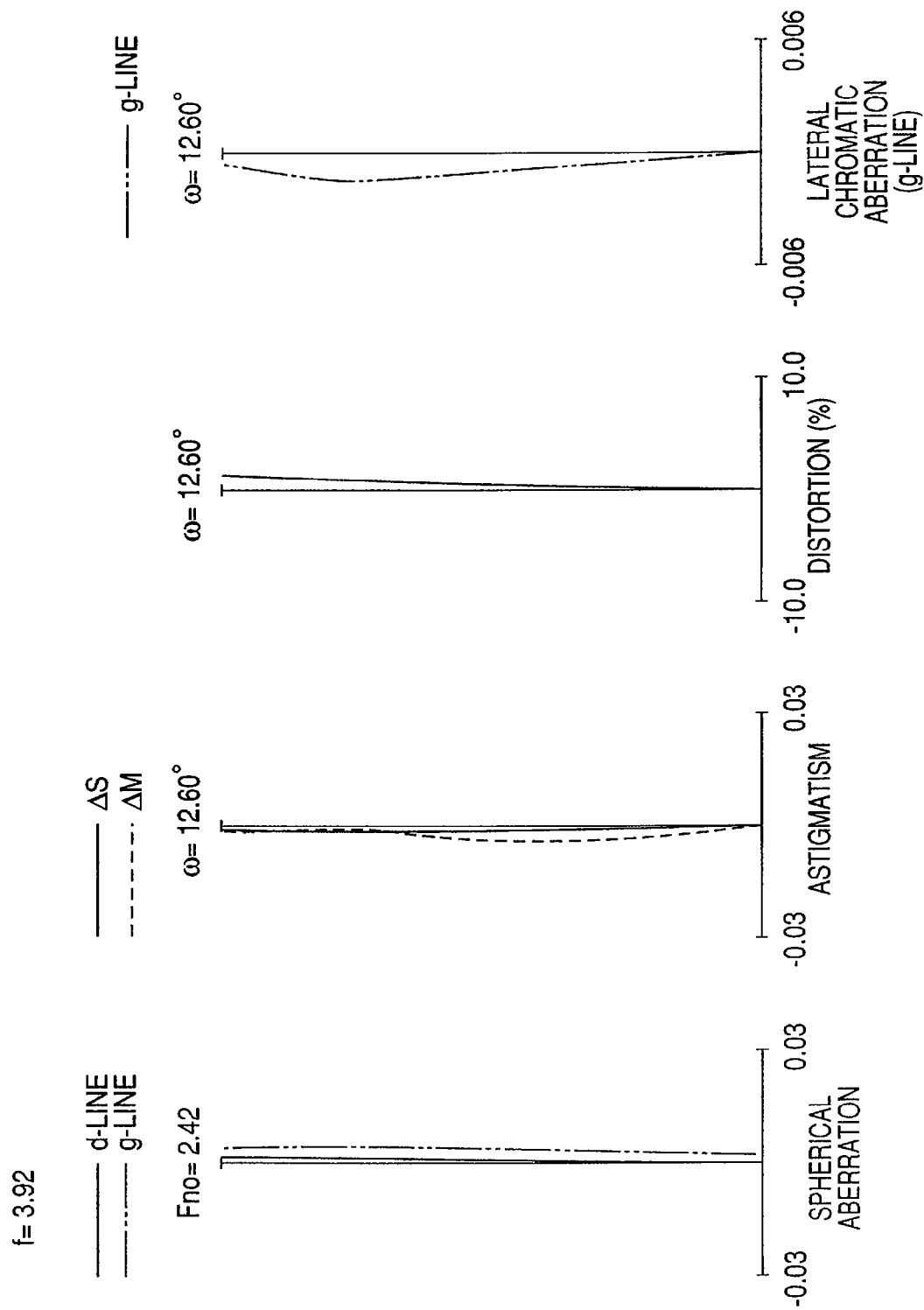
FIG. 23 shows aberration diagrams for the numerical embodiment according to the sixth embodiment at an intermediate zoom position.
Figure 24:
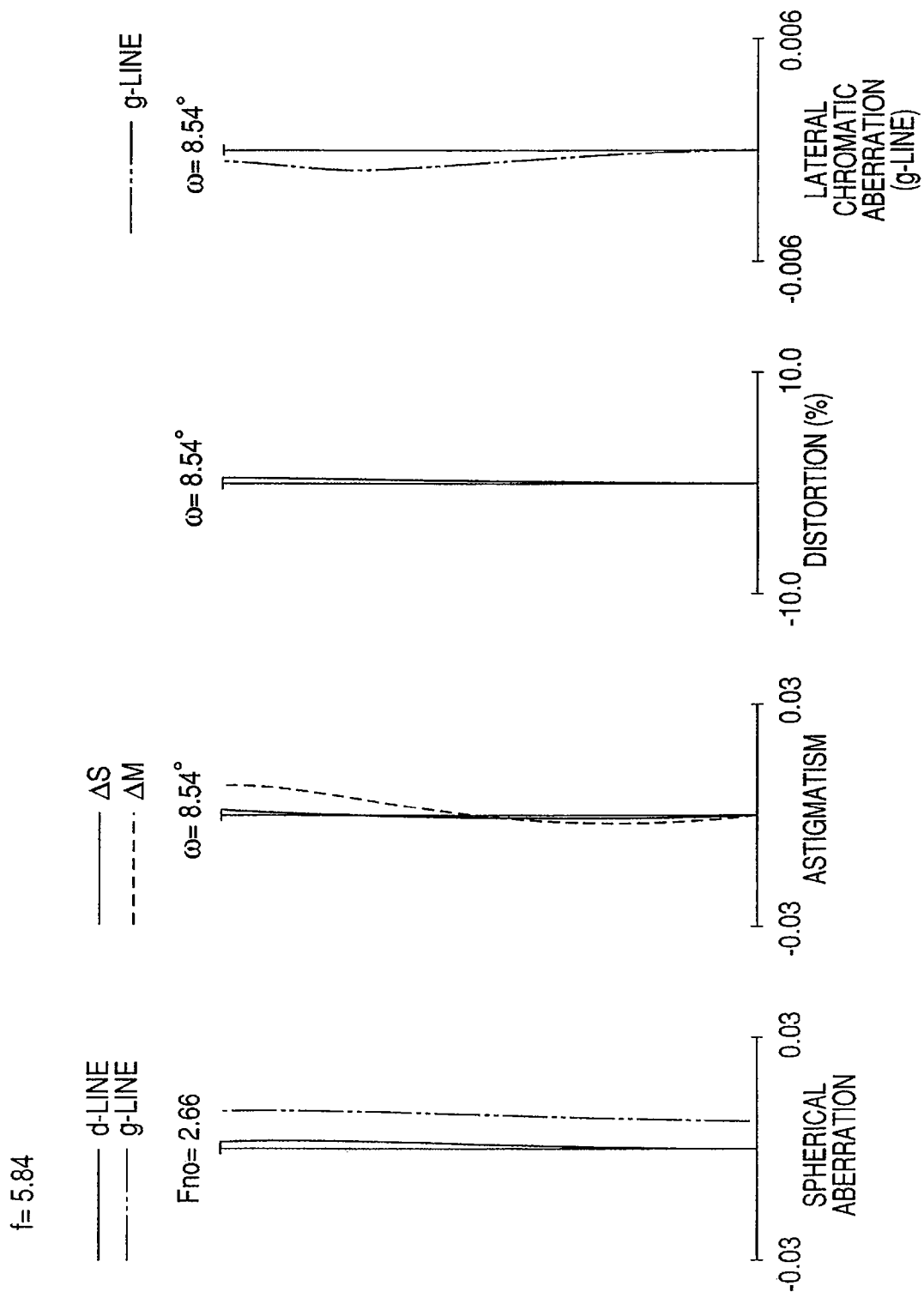
FIG. 24 shows aberration diagrams for the numerical embodiment according to the sixth embodiment at the telephoto end.

FIG. 21 is a cross sectional view showing the lens configuration of a zoom lens according to the sixth embodiment of the present invention at the wide angle end. FIGS. 22, 23 and 24 show aberrations of the zoom lens according to the sixth embodiment respectively at the wide angle end, at an intermediate zoom position and at the telephoto end.

Figure 25:
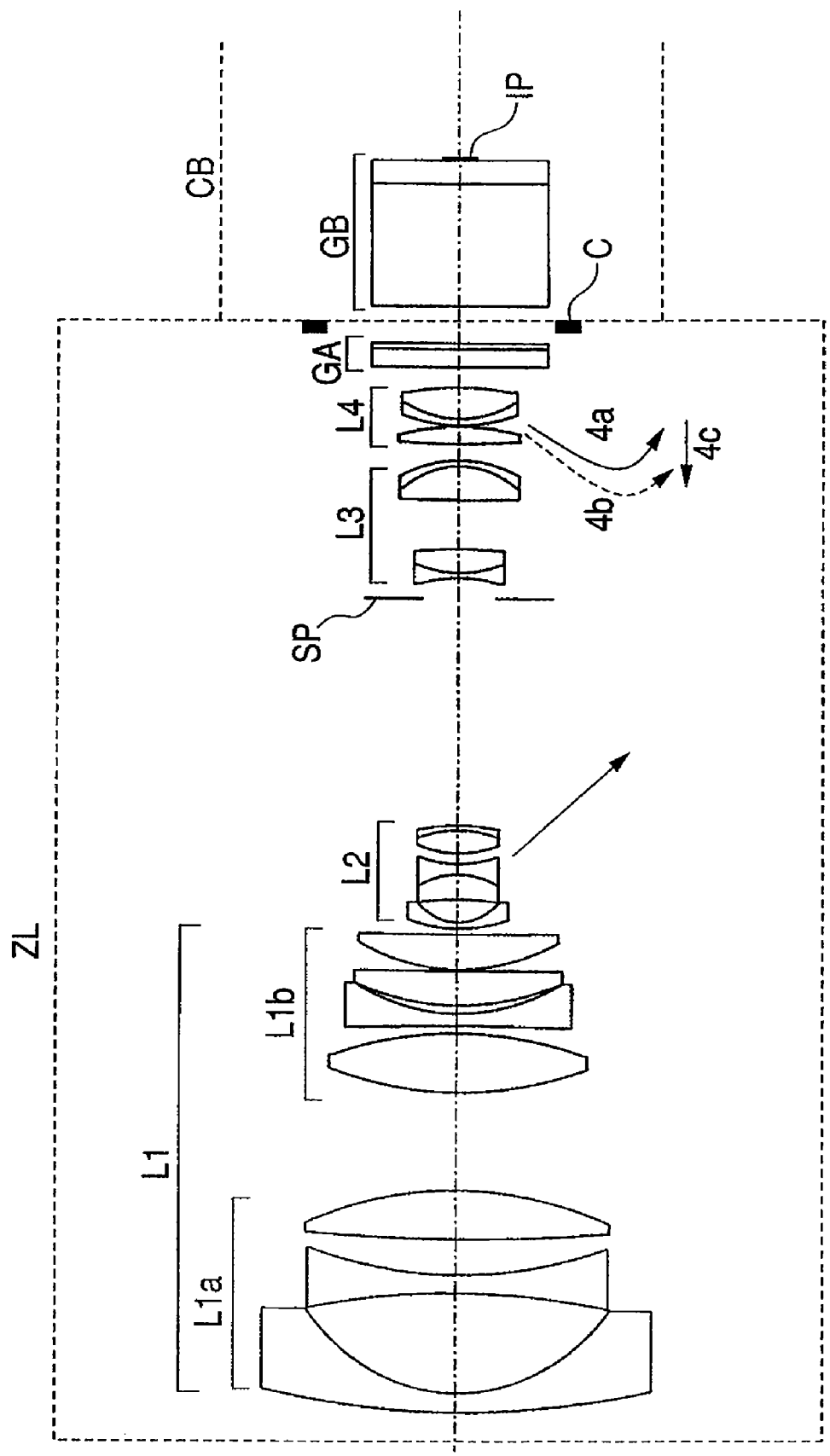
FIG. 25 is a cross sectional view of a zoom lens according to a seventh embodiment.
Figure 26:
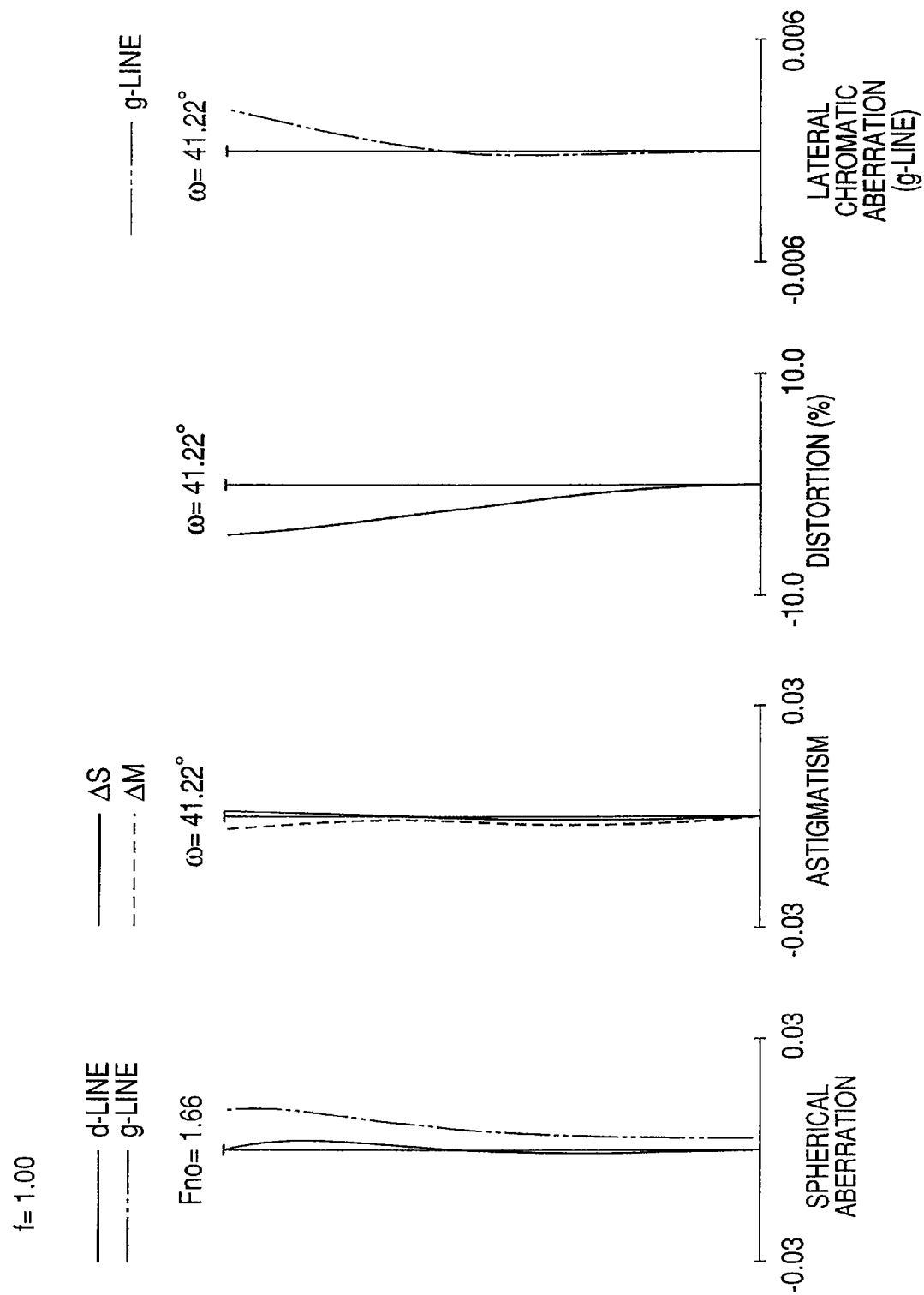
FIG. 26 shows aberration diagrams for a numerical embodiment corresponding to the seventh embodiment at the wide angle end.
Figure 27:
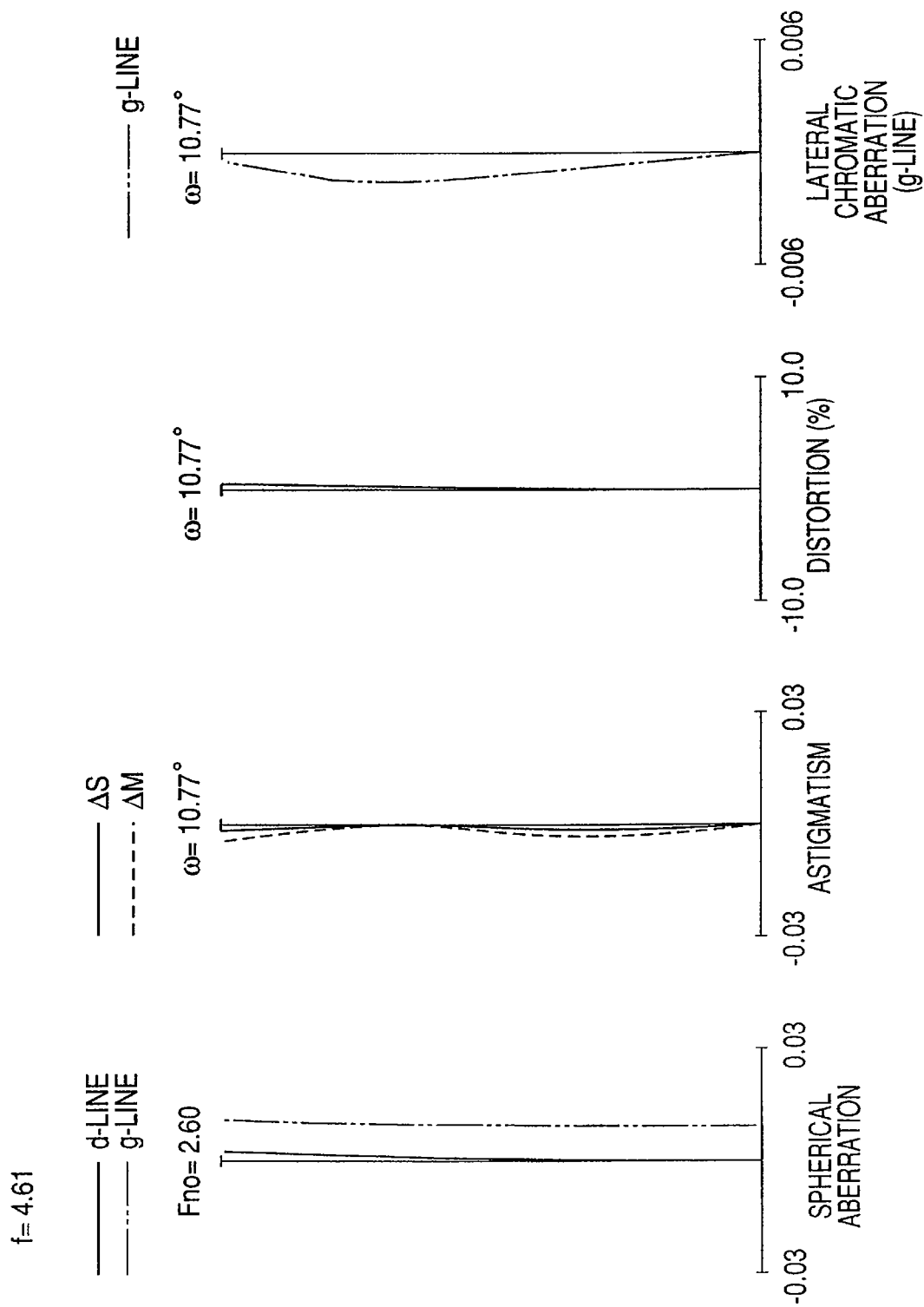
FIG. 27 shows aberration diagrams for the numerical embodiment according to the seventh embodiment at an intermediate zoom position.
Figure 28:
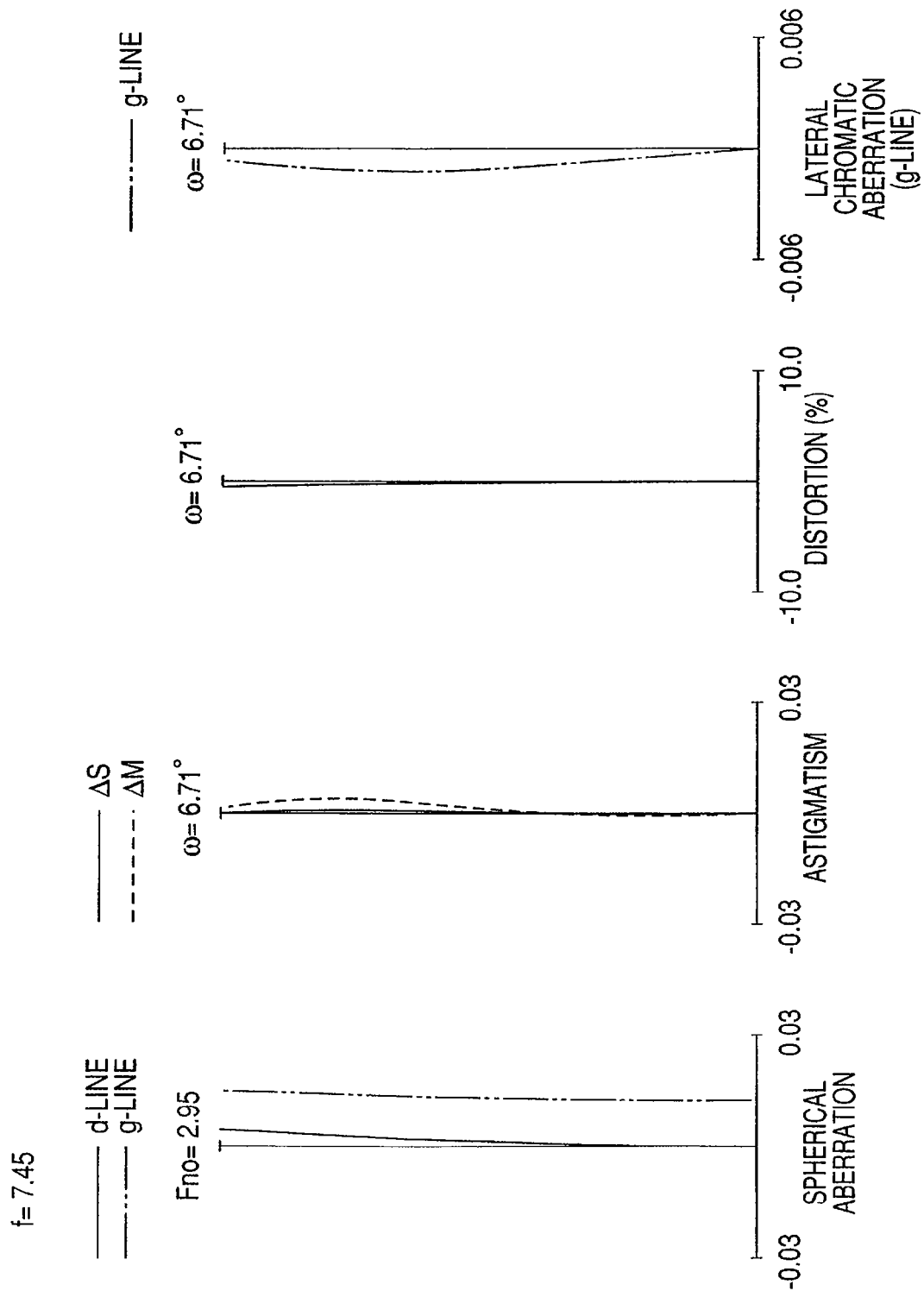
FIG. 28 shows aberration diagrams for the numerical embodiment according to the seventh embodiment at the telephoto end.

FIG. 25 is a cross sectional view showing the lens configuration of a zoom lens according to the seventh embodiment of the present invention at the wide angle end. FIGS. 26, 27 and 28 show aberrations of the zoom lens according to the seventh embodiment respectively at the wide angle end, at an intermediate zoom position and at the telephoto end.

Figure 29:
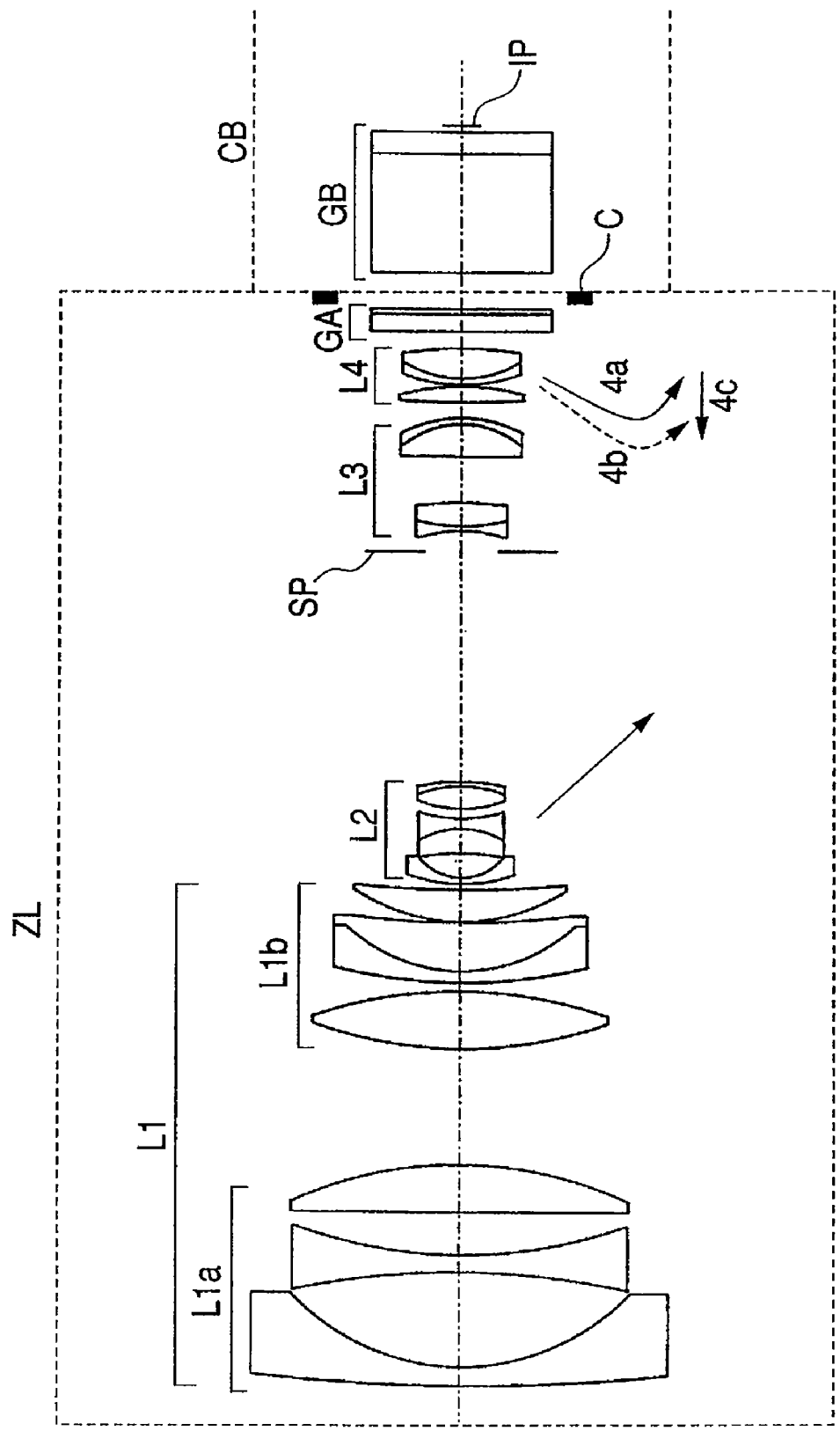
FIG. 29 is a cross sectional view of a zoom lens according to a eighth embodiment.
Figure 30:
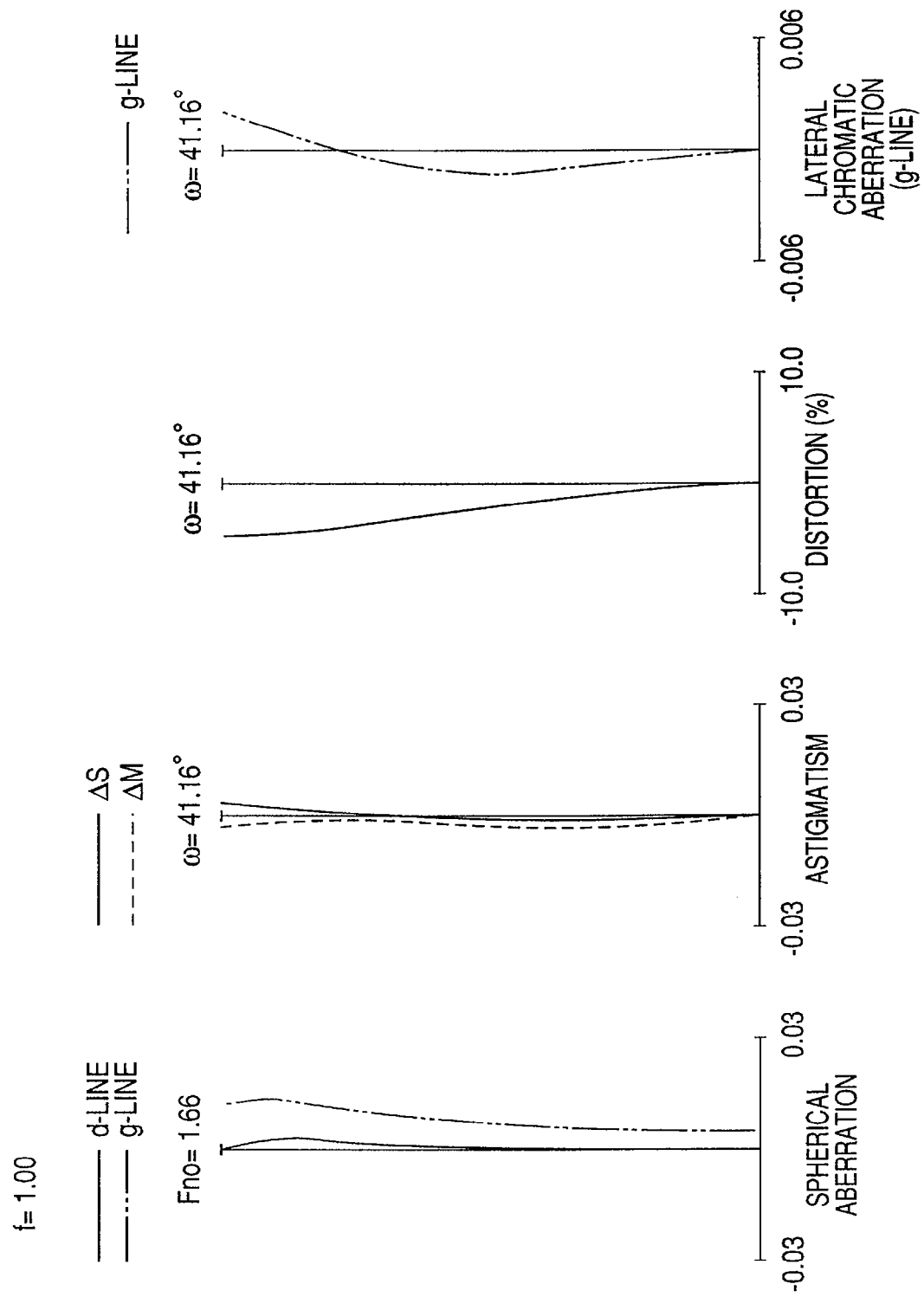
FIG. 30 shows aberration diagrams for a numerical embodiment corresponding to the eighth embodiment at the wide angle end.
Figure 31:
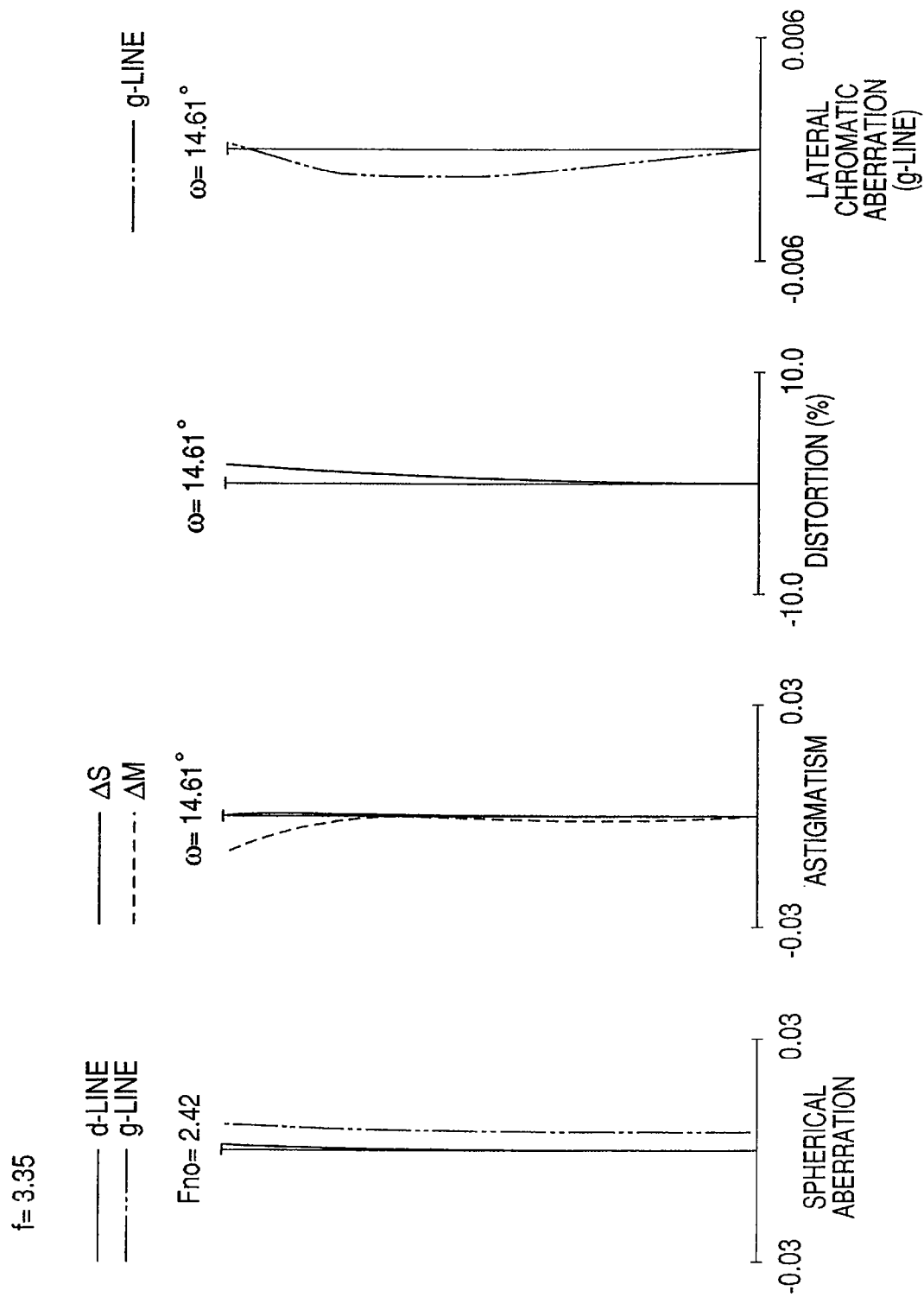
FIG. 31 shows aberration diagrams for the numerical embodiment according to the eighth embodiment at an intermediate zoom position.
Figure 32:
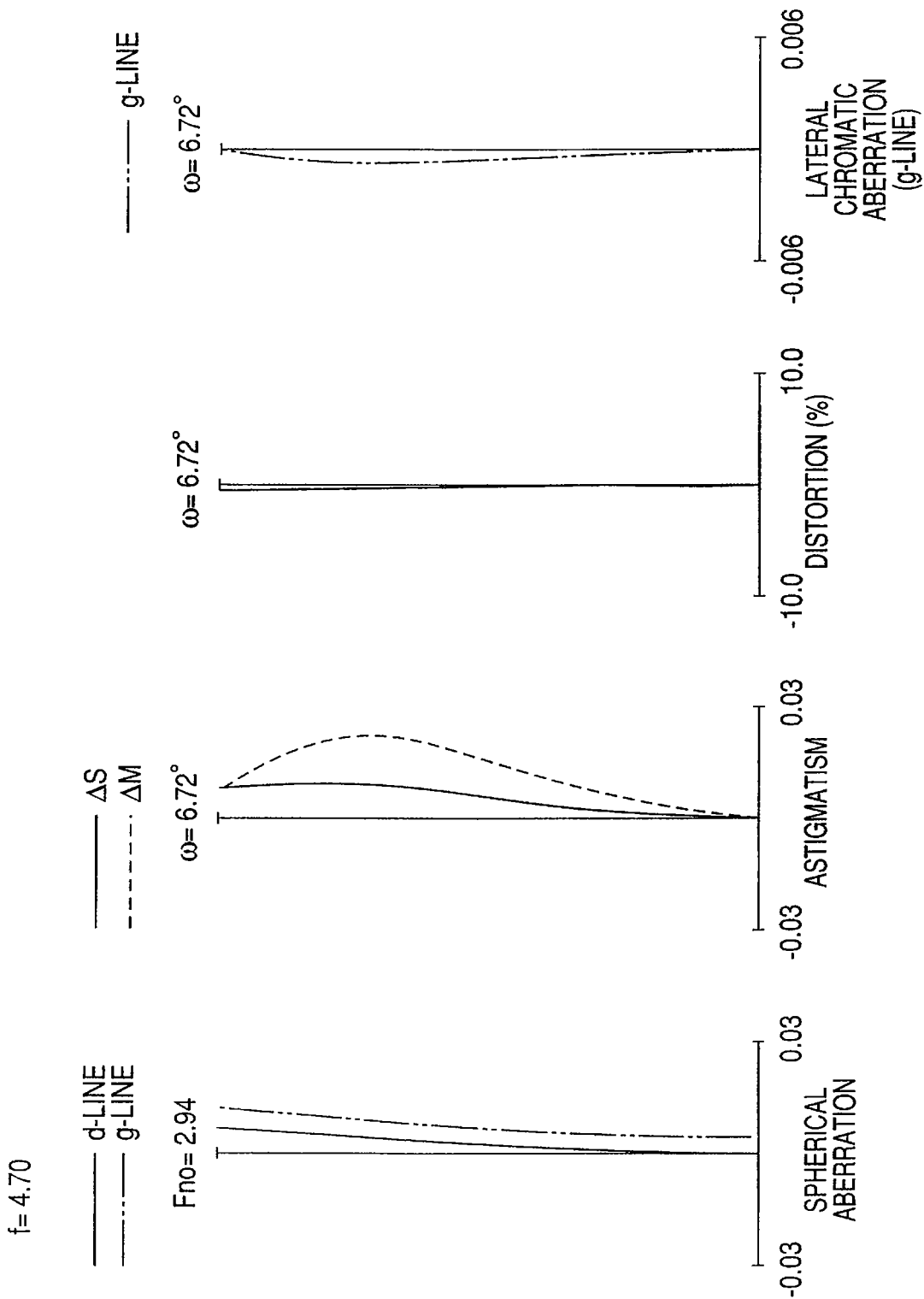
FIG. 32 shows aberration diagrams for the numerical embodiment according to the eighth embodiment at the telephoto end.

FIG. 29 is a cross sectional view showing the lens configuration of a zoom lens according to the eighth embodiment of the present invention at the wide angle end. FIGS. 30, 31 and 32 show aberrations of the zoom lens according to the eighth embodiment respectively at the wide angle end, at an intermediate zoom position and at the telephoto end.

Figure 33:
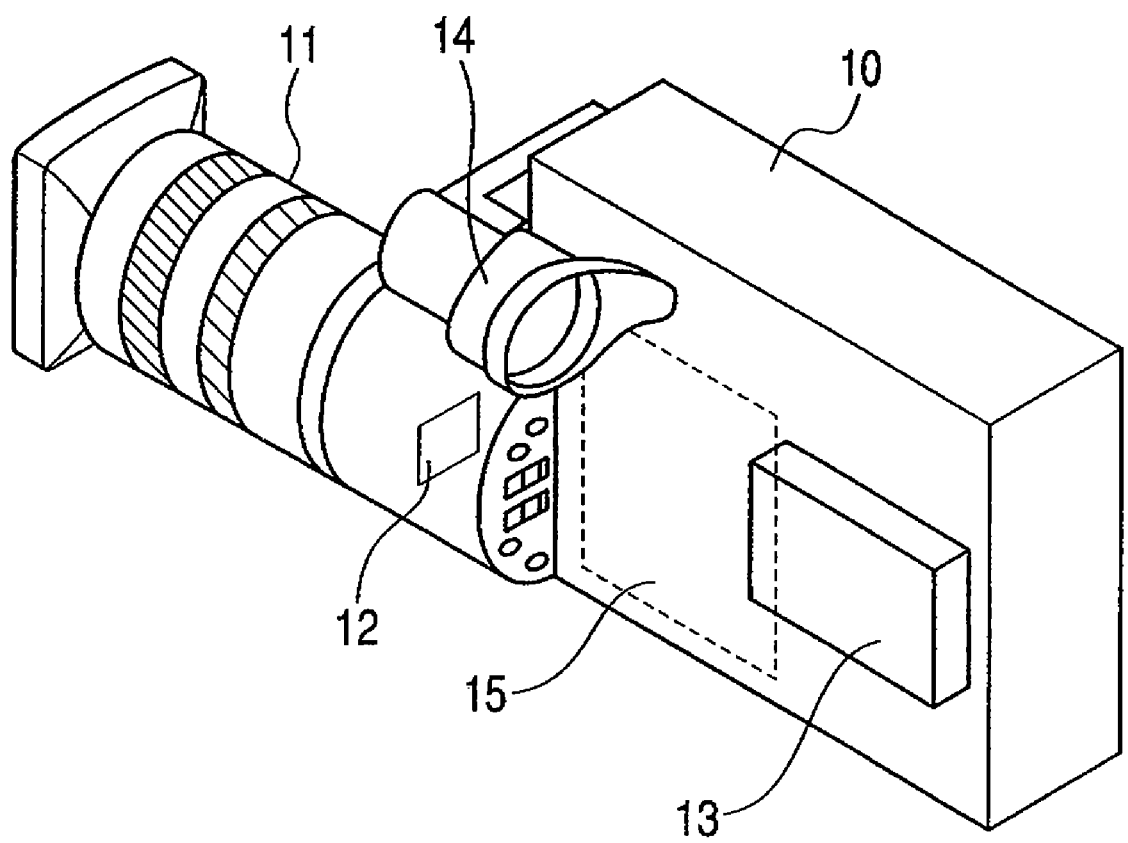
FIG. 33 is a perspective view schematically illustrating the relevant portions of an image pickup apparatus according to the present invention.

FIG. 33 is a schematic illustration of a video camera (image pickup apparatus) equipped with a zoom lens according to the present invention.

The zoom lens according to each embodiment is a taking optical system used in an image pickup apparatus, and the zoom lens ZL and the camera body CB are illustrated in each of the cross sectional views.

Each zoom lens has a positive first lens unit L1, namely a first lens unit L1 having a positive refractive power (i.e. optical power represented by the inverse of the focal length), a negative second lens unit L2, a positive third lens unit L3, a positive fourth lens unit L4 and a positive fifth lens unit L5. The zoom lens also has an aperture stop SP for adjusting the light quantity, which is disposed on the object side of the third lens unit L3.

In the seventh and eighth embodiments shown in FIGS. 25 and 29, there is provided a protection glass plate GA, which is sometimes provided additionally to protect the zoom lens ZL, if need be. Such a protection glass plate GA may also be provided in the first to sixth embodiment.

In the cross sectional views is also illustrated an optical block GB. The optical block GB may be a color separating prism, an optical filter, a face plate and/or a low pass filter. In the case where the zoom lens is used as a taking optical system of a video camera or a digital still camera, the image plane IP of the zoom lens corresponds to the image pickup surface of a solid state image pickup element (photoelectric conversion element) such as a CCD sensor or a CMOS sensor. In the case where the zoom lens is used as a taking optical system of a film camera, the image plane IP corresponds to the film surface.

The first to the fifth lens units L1 to L5 (and the protection glass GA in the case of the seventh and eighth embodiments shown in FIGS. 25 and 29) are elements of the zoom lens (or zoom lens portion) ZL. On the other hand, the glass block GB and the image pickup element are housed in the camera body CB. The zoom lens portion ZL is detachably mounted on the camera body CB using a mount portion C.

In the aberration diagrams are shown curves for the d-line and g-line (designated by "d" and "g") and the meridional image plane ΔM and the sagittal image plane ΔS. The lateral chromatic aberrations are shown for the g-line.

The F-number Fno of the lens and half the angle of view ω are also shown in the aberration diagrams.

In the following description of the embodiments, the wide angle end and the telephoto end refer to the zoom positions at the time when the zooming or variator lens unit (that is, the second lens unit L2 in the embodiments) is at the respective ends of the range over which that lens unit can move mechanically along the optical axis.

In all the embodiments, during zooming (i.e. during changing the focal length) from the wide angle end to the telephoto end, the second lens unit L2 is moved toward the image side to change the focal length as illustrated by an arrow in each cross sectional view, and the fourth lens unit L4 is moved in a way represented by an arrow (in the cross sectional view) that is convex toward the object side to correct image plane variations caused during zooming.

The zoom lenses according to the embodiments are rear focus systems in which focusing is performed by moving a part of the fourth lens unit L4 or the whole of the fourth lens unit L4 (the latter being the case in the illustrated embodiments) along the optical axis.

The way of movement of the fourth lens unit L4 during zooming changes depending on the object distance.

The solid curved arrow 4a and the broken curved arrow 4b in each cross sectional view represent how the fourth lens unit L4 moves to correct image plane variations during zooming respectively when the zoom lens is focused on an object at infinity and when the zoom lens is focused at an object at a short distance. By moving the fourth lens unit L4 in a manner represented by a curved arrow that is convex toward the object side, the space between the third lens unit L3 and the fourth lens unit L4 can be used efficiently, and the entire length of the zoom lens can be reduced advantageously.

In each embodiment, during focusing operation from an object at infinity to an object at a short distance at, for example, the telephoto end zoom position, the fourth lens unit L4 is moved frontward as represented by arrow 4c. The first lens unit L1 and the third lens unit L3 are not moved along the optical axis during zooming or focusing, but they may be moved, if necessary, to correct aberrations.

In each embodiment, a part or the whole of the third lens unit L3 (which constitutes the image stabilizing lens unit) is moved in such a way to have a movement component in the direction perpendicular to the optical axis to correct image blur caused by vibration of the entire optical system. In this way, image stabilization is performed.

As per the above, image stabilization is performed without providing additional optical members such as a variable angle prism or an additional image-stabilizing lens unit. Thus, increase in the size of the entire optical system can be prevented.

A video camera according to the present invention illustrated in FIG. 33 has the above described zoom lens, a color separating element, image pickup elements for respective colors resulting from separation by the color separating element and a circuit for processing picked-up image signals.

In the following, the lens configurations of the lens units in the first to sixth embodiments shown in FIGS. 1, 5, 9, 13, 17 and 21 will be described.

Each of the zoom lenses according to the first to sixth embodiments has a positive first lens unit L1, a negative second lens unit L2, a positive third lens unit L3, a positive fourth lens unit L4 and a positive fifth lens unit L5 arranged in the mentioned order from the object side to the image side.

As described before, the second and fourth lens units L2 and L4 are moved during zooming. The first lens unit L1 includes a negative lens subunit L1a and a positive lens subunit L1b. Here, the negative lens subunit is located L1a at a position nearer the object side than that of the positive lens subunit L1b.

The negative lens subunit L1a is defined as the lens unit that is on the object side (i.e. on the magnification conjugate side) of the largest air gap among the air gaps in the first lens unit L1 except for the air gap between the lens closest to the object (or the frontmost lens) in the first lens unit L1 and the lens on the image side thereof (or the second-frontmost lens). The positive lens subunit L1b is defined as the lens unit on the image side (i.e. on the reduction conjugate side) of the aforementioned largest air gap in the first lens unit L1. In the illustrated embodiments, the first lens unit L1 includes, as lens subunits, only the negative lens subunit L1a and the positive lens subunit L1b.

The negative lens subunit L1a includes two negative lenses each having a concave surface facing the image side and a biconvex positive lens having a refractive power whose absolute value is larger on the image side than on the object side. In other words, the absolute power of the image side surface of this biconvex positive lens is larger than the absolute value of the refractive power of object side surface thereof.

The positive lens subunit L1b includes a biconvex positive lens, a negative lens having a concave surface facing the image side or a cemented lens composed of a negative lens having a concave surface facing the image side and a positive lens, and one or two positive lenses each having a convex surface facing the object side.

The negative lens subunit L1a may include two or more negative lenses (may include three or four negative lenses) each having a concave surface facing the image side and a biconvex positive lens having a refractive power whose absolute value is larger on the image side than on the object side.

The positive lens subunit L1b may includes a biconvex positive lens, a negative lens or a cemented lens composed of a negative lens and a positive lens, and a positive lens that is disposed closest to the image side in that subunit, having a convex surface facing the object side and having a refractive power whose absolute value is larger on the object side than on the image side.

The positive lens subunit L1b may include a biconvex positive lens, a negative lens and a positive lens having a convex surface facing the object side. In this case, the lens configuration can be made simple.

Axial chromatic aberration and spherical aberration are excellently corrected by the lens configuration of the positive lens subunit L1b including at least one negative lens or a cemented lens and a positive lens disposed closest to the image side and having a convex surface facing the object side.

As per the above, the positive lens subunit L1b is composed of three to five lenses to correct aberrations excellently.

Thanks to correction achieved by the above described lens configuration of the first lens unit L1, distortion in the zoom lenses according to the embodiments is on a par with zoom lenses having normal angles of view, in spite that the zoom lenses according to the embodiments have ultra-wide angles of view of 75 degrees or more at the wide angle end.

In addition, astigmatism and curvature of field are also corrected excellently.

The second lens unit L2 includes a negative meniscus lens having the concave surface facing the image side, a cemented lens composed of a positive lens having a convex surface facing the image side and a biconcave negative lens, and a cemented lens composed of a biconvex positive lens and a negative lens or a single positive lens, arranged in the mentioned order from the object side to the image side. In the second lens unit L2, one or two negative lens may be provided on the image side of the negative lens that is disposed closest to the object.

With the above described configuration of the second lens unit L2 that is moved for zooming, aberrations are corrected excellently. To achieve excellent optical performance, the lens configuration of the second lens unit L2 is designed in such a way as to excellently correct aberration variations caused during zooming.

An aspherical surface is used in the second lens unit L2 in each embodiment. The use of the aspherical lens in the second lens unit L2 is advantageous in correcting astigmatism at the wide angle end satisfactorily to achieve excellent optical performance.

The third lens unit L3 includes a cemented lens composed of a biconcave negative lens and a positive lens, and a cemented lens composed of a positive lens and a negative lens or a single positive lens arranged in the mentioned order from the object side to the image side.

A part or the whole of the third lens unit L3 is moved in such a way as to have a movement component in the direction perpendicular to the optical axis to thereby shift the image.

The third lens unit L3 includes a cemented lens composed of a biconcave negative lens and a positive lens, and a cemented lens composed of a positive lens and a negative lens or a single positive lens (alternatively, two or more positive lenses may be provided) arranged in the mentioned order from the object side to the image side.

The third lens unit L3 has at least one aspherical surface. By the use of the aspherical surface(s), spherical aberration and coma at the wide angle end and lateral chromatic aberration are satisfactorily corrected.

It is desired that the aspherical surface used in the third lens unit L3 have a refractive power that decreases from the center toward the periphery of the lens.

A part or the whole of the third lens unit L3 is moved in such a way as to have a movement component in the direction perpendicular to the optical axis to thereby shift the image. In other words, a part or the whole of the third lens unit L3 is moved in such a way as to have a movement component in the direction perpendicular to the optical axis in order to perform image stabilization, namely to reduce image blur or to reduce positional shift of the image.

The fourth lens unit L4 includes a positive lens, and a cemented lens composed of a negative lens and a positive lens arranged in the mentioned order from the object side to the image side.

The fifth lens unit L5 includes a cemented lens composed of a biconvex positive lens and a negative lens arranged in the mentioned order from the object side to the image side.

In the lens system as a whole, the lens configuration of the fifth lens unit L5 is relevant to the fourth lens unit. The fifth lens unit L5 takes over a portion of the role of correcting spherical aberration and chromatic aberration that the moving fourth lens unit L4 is required to play. Thus, the number of lenses in the fourth lens unit L4 can be reduced. Thus, the fourth lens unit L4 can have a configuration that is most suitable for quick focusing.

The fifth lens unit L5 correct aberrations, especially spherical aberration and chromatic aberration remaining uncorrected by the first to fourth lens units L1 to L4, thereby achieving aberration correction adequate for high quality image forming.

In the following, the lens configuration of each lens unit in the seventh and eighth embodiments illustrated in FIGS. 25 and 29 will be described.

Each of the zoom lenses according to the seventh and eight embodiments has a positive first lens unit L1, a negative second lens unit L2, a positive third lens unit L3 and a positive fourth lens unit L4 arranged in the mentioned order from the object side to the image side.

During zooming, the second and fourth lens units L2 and L4 are moved, as described before.

The first lens unit L1 includes a negative lens sub unit L1a and a positive lens subunit L1b.

The lens configurations of the negative lens subunit L1a and the positive lens subunit L1b and advantages they have are the same as those in the first to sixth embodiments.

The second lens unit L2 includes a negative meniscus lens having the concave surface facing the image side, a cemented lens composed of a positive lens having a convex surface facing the image side and a biconcave negative lens, and a cemented lens composed of a biconvex positive lens and a negative lens, and the cemented lens composed of the biconvex positive lens and the negative lens can be replaced with a single positive lens, arranged in the mentioned order from the object side to the image side.

The third lens unit L3 includes a cemented lens composed of a biconcave negative lens and a positive lens, and a cemented lens composed of a positive lens and a negative lens, arranged in the mentioned order from the object side to the image side.

The configuration of the fourth lens unit L4 is the same as that in the first to sixth embodiments.

In these embodiments, the positive lens subunit may include at least one biconvex positive lens, a negative lens, and at least two positive lenses arranged in the mentioned order from the object side to the image side, or alternatively at least one biconvex positive lens, a cemented lens composed of a negative lens and a positive lens, and at least one positive lens arranged in the mentioned order from the object side to the image side.

The positive lens disposed closest to the image side in the positive lens subunit is a positive lens having a convex surface facing the object side and having a refractive power whose absolute value is larger on the object side than on the image side. To put it differently, the absolute value of the refractive power of the object side surface of the positive lens disposed closest to the image side in the positive lens subunit is larger than the absolute value of the refractive power of the image side surface of the positive lens disposed closest to the image side in the positive lens subunit, and the object side surface of the positive lens disposed closest to the image side in the positive lens subunit is a convex surface.

In the case where the positive lens subunit includes at least one biconvex positive lenses, a negative lens, and at least two positive lenses arranged in the mentioned order from the object side, the aforementioned at least two positive lenses may be two positive lenses each having a convex surface facing the object side. On the other hand, in the case where the positive lens subunit includes at least one biconvex positive lens, a cemented lens composed of a negative lens and a positive lens, and at least one positive lens arranged in the mentioned order from the object side, the aforementioned at least one positive lens may be one or two positive lenses each having a convex surface facing the object side.

The zoom lens according to each of the above described embodiments is designed to satisfy at least one of the conditions presented below and has advantages associated with the corresponding conditions.

In the conditional expressions below, $f1a$ is the focal length of the negative lens subunit L1a and $f1$ is the focal length of the first lens unit L1, $H12w$ is the principal point interval of the first lens unit L1 and the second lens unit L2 at the wide angle end, and $fw$ is the focal length of the entire lens system at the wide angle end. Furthermore, $R1bf$ is the radius of curvature of the object side surface of the negative lens in the positive lens subunit L1b, $f2$ is the focal length of the second lens unit L2, $Fnow$ is the F-number of the entire lens system at the wide angle end, and BF is what is called the back focus or the equivalent distance in air (i.e. the distance under the assumption that there is no optical block such as a prism) from the lens surface closest to the image side to the image plane at the wide angle end.

Each zoom lens satisfies at least one of the following conditions.

$$1.8 < |f1a/f1| < 4.0 \quad (1)$$

$$-7.7 < H12w/fw < -3.5 \quad (2)$$

$$-0.09 < f1/R1bF < 0.455 \quad (3)$$

$$2.8 < |f2/fw| < 5.2 \quad (4)$$

$$6.4 < BF \times \sqrt{F_{no}W}/fw < 15.0 \quad (5)$$

In the following, technical meanings of the above conditions will be described.

Conditional expression (1) is intended to limit the refractive power of the negative lens subunit L1a in the first lens unit L1. This conditional expression (1) relates indirectly to the principal point interval in first and second lens units L1, L2. If the value of $|f1a/f1|$ is larger than the upper bound of conditional expression (1), the principal point interval cannot be made short, and the lens system becomes undesirably large. On the other hand, if the negative refractive power of the negative lens subunit L1a is so strong that the value of $|f1a/f1|$ becomes smaller than the lower bound of conditional expression (1), it is difficult to achieve satisfactory correction of astigmatism and lateral chromatic aberration, though such a strong refractive power is advantageous in making the principal point interval short.

Conditional expression (2) expresses a condition to reduce the entire length of the lens system while achieving satisfactory correction of aberrations. If the principal point interval is so large that the value of $H12w/fw$ becomes larger than the upper bound of conditional expression (2), the diameter of the frontmost lens is required to be made large, which makes it difficult to make the size of the zoom lens small.

On the other hand, if the principal point interval is so small that the value of H12w/fw becomes smaller than the lower bound of conditional expression (2), it is difficult to achieve satisfactory correction of astigmatism and lateral chromatic aberration in the zoom range from the wide angle end to an intermediate zoom position.

Conditional expression (3) expresses a condition to achieve satisfactory correction of aberrations, in particular distortion and lateral chromatic aberration, at the wide angle end. If the curvature of the object side surface of the negative lens in the positive lens subunit L1b is so large that the value of f1/R1bF becomes larger than the upper bound of conditional expression (3), positive lateral chromatic aberration becomes undesirably large. On the other hand, if the curvature of that surface is so small that the value of f1/R1bF becomes smaller than the lower bound of conditional expression (3), negative distortion becomes undesirably large.

Conditional expressions (4) and (5) express conditions to make the size of the entire lens system small, to achieve a wide angle of view and to ensure a long back focus. By designing a zoom lens in such a way as to satisfy at least one of these conditional expressions (4) and (5), the zoom lens system can be made well-balanced.

Conditional expression (4) relates to the negative refractive power of the second lens unit L2 and is intended to limit the refractive power of the variator lens unit in order to achieve an ultra wide angle of view.

In addition, conditional expression (4) expresses a condition to achieve a high zoom ratio while making aberration variations during zooming small.

If the negative refractive power of the second lens unit L2 is so weak that the value of |f2/fw| becomes larger than the upper bound of conditional expression (4), the afocal magnification in the variator portion cannot be made sufficiently high, and it becomes difficult to provide a desired back focus. In addition, movement amount of the second lens unit L2 required to achieve a desired zoom ratio becomes large, which leads to an increase in the distance between the stop SP and the first lens unit L1. This invites an undesirable increase in the diameter of the frontmost lens.

On the other hand, if the negative refractive power of the second lens unit L2 is so strong that the value of |f2/fw| becomes smaller than the lower bound of conditional expression (4), the negative Petzval sum becomes large, so does the curvature of field, and aberration variations during zooming also become large.

Conditional expression (5) relates to relationship between the back focus BF and the F-number of the zoom lens. Conditional expression (5) expresses a condition to obtain a high quality image by separating light into three color components using a color separating prism and picking up images of the respective colors. Such an image pickup system is used in a high performance camera.

If the F-number is so small that the value of $BF \times \sqrt{F_{no}W}/fw$ becomes smaller than the lower bound of conditional expression (5), a significant amount of high order spherical aberration and coma occur, and it is difficult to correct these aberrations. On the other hand, when the F-number is so large that the value of $BF \times \sqrt{F_{no}W}/fw$ becomes larger than the upper bound of conditional expression (5), the diameter of the on-axis light flux becomes small, and the size of the color separating prism provided on the image side of the zoom lens can be made small. This results in unnecessary enlargement of the back focus and undesirable increase in the length of the entire lens system.

In the zoom lens according to each embodiment, the third lens unit L3 includes a plurality of lenses arranged with at least one air gap therebetween. The length D3a of the at least one air gap along the optical axis and the focal length f3 of the third lens unit L3 satisfy the following condition.

$$0.01 < D3a/f3 < 0.1 \tag{6}$$

The air gap in the third lens unit L3 is provided to allow to insert, in a removable manner, a light quantity adjusting filter such as one or more ND filters besides the stop for adjusting the light quantity.

In the zoom lenses according to the embodiments, one or plurality of light quantity adjusting filters is inserted into the optical path in a removable manner to control the quantity of light incident on the image pickup element.

If the air gap is so large that the value of D3a/f3 becomes larger than the upper bound of conditional expression (6), the size of the entire lens system becomes large, and it becomes difficult to correct spherical aberration at the wide angle end. On the other hand, if the air gap is so small that the value of D3a/f3 becomes smaller than the lower bound of conditional expression (6), it becomes difficult to insert a light quantity adjusting filter into the optical path in a removable manner.

The focal length f1FF of the composite system composed of a negative lens subunit L1a and the biconvex positive lens in the positive lens sub unit L1b and the focal length f1 of the first lens unit satisfy the following condition.

$$0.02 < f1/f1FF < 0.83 \tag{7}$$

A wide conversion lens to be provided, in a removable manner, on the object side of the first lens unit is generally an afocal system having substantially zero refractive power.

In the zoom lenses according to the embodiments, if a part of the lenses in the first lens unit L1 constituted an afocal system, they should be the negative lens subunit L1a and the object side positive lens in the positive lens subunit L1b.

However in the zoom lenses according to the embodiments, an afocal system is not added in, and the composite system composed of the negative lens subunit L1a and the object side positive lens in the positive lens subunit L1b has a certain refractive power.

Conditional expression (7) appropriately limits the refractive power (as the reciprocal of the focal length) of the composite system.

Conditional expression (7) expresses a condition to make the size of the entire system small. If the focal length of the composite system is so large that the value of f1/f1FF becomes smaller than the lower bound of conditional expression (7), the size of the entire lens system becomes large. On the other hand, if the focal length of the composite system is so small that the value of f1/f1FF becomes larger than the upper bound of conditional expression (7), it becomes difficult to correct spherical aberration.

The zoom lenses according to the first to sixth embodiments satisfy the following condition in terms of the focal length f3 of the third lens unit L3 and the focal length f5 of the fifth lens unit L5.

$$1.2 < f3/f5 < 3.6 \tag{8}$$

Conditional expression (8) relates to the ratio of the focal length f3 of the third lens unit L3 and the focal length f5 of the fifth lens unit L5. More specifically, conditional expression (8) expresses a condition to achieve a high zoom ratio and a long back focus. If the focal length f3 of the third lens unit L3 is so large that the value of f3/f5 becomes larger than the upper bound of conditional expression (8), the light flux emergent from the third lens unit L3 diverges greatly. Then, it is required to make the effective diameter of the fourth lens unit L4 large, which leads to an increase in the weight of the entire lens system, though a long back focus is achieved.

On the other hand, if the focal length f3 of the third lens unit L3 is so short that the value of f3/f5 becomes smaller than the lower bound of conditional expression (8), it becomes difficult to achieve a sufficiently long back focus. Furthermore, if the focal length f5 of the fifth lens unit L5 is too long, spherical aberration cannot be corrected sufficiently.

It is more desirable in achieving excellent optical performance more easily that the lower and upper bounds in conditional expressions (1) to (8) be modified as follows.

$$2.0 < |f1a/f1| < 3.5 \tag{1a}$$

$$-7.0 < H12w/fw < -4.0 \tag{2a}$$

$$-0.07 < f1/R1bF < 0.417 \tag{3a}$$

$$3.1 < |f2/fw| < 4.8 \tag{4a}$$

$$7.0 < BF \times \sqrt{F_{no}W}/fw < 13.0 \tag{5a}$$

$$0.015 < D3a/f3 < 0.09 \tag{6a}$$

$$0.1 < f1/f1FF < 0.75 \tag{7a}$$

$$1.4 < f3/f5 < 3.2 \tag{8a}$$

More preferably, the upper bound of conditional expression (1a) may be changed to 3.3, and the lower bound of conditional expression (7a) may be changed to 0.3.

In the zoom lenses according to the embodiments, the specifications of the elements are determined so that distortion in the state that the zoom lens is focused on an object at infinity at the wide angle end falls within the range of −6% to 0% throughout the image frame.

With enlargement of the angle of view to ultra-wide angles, distortion increases more and more, and large minus distortion or barrel distortion occurs. In recent years, the surface of the display panel of TV monitors has been made flat, which makes barrel distortion more conspicuous. Therefore, it is necessary to correct distortion excellently.

Conventionally, in order to correct distortion, a positive lens is disposed closest to the object side or an aspherical surface is used as the surface closest to the object side.

In the zoom lenses according to the embodiments, distortion is corrected excellently by the above described configuration of the first lens unit L1.

An optical member having a weak refractive power may be provided on the image side of the fifth lens unit L5 in the zoom lenses according to the first to sixth embodiments, and on the image side of the fourth lens unit L4 in the seventh and eighth embodiments, and/or on the object side of the first lens unit L1.

In the following, an embodiment of a video camera (image pickup apparatus) having a zoom lens according to the present invention as a taking optical system will be described with reference to FIG. 33.

In FIG. 33 are illustrated a body 10 or a video camera or a digital still camera and a taking optical system 11 in the form of a zoom lens according to the present invention. An image pickup element 12 such as a CCD receives an object image formed by the taking optical system 11. Recording means 13 records data of the object image received by the image pickup element 12. A user can view an object image displayed on a display element of a viewfinder 14.

The display element may be a liquid crystal panel, on which the object image picked up by the image pickup element 12 is displayed. The video camera also has a liquid crystal display panel 15 having a function similar to the aforementioned view finder.

By using the zoom lens according to the present invention in an image pickup apparatus such as a video camera, an optical apparatus having excellent optical performance can be provided.

As per the above, according to the embodiments of the present invention, there can be provided zoom lenses that are small in the size of the entire lens system and have excellent optical performance in spite of high zoom ratios, and an image pickup apparatus using such a zoom lens.

In addition, according to the embodiments of the present invention, there can be provided zoom lenses having excellent optical performance throughout the zoom range from the wide angle end to the telephoto end and throughout the object distance range from a very short distance to infinity in spite of their high zoom ratios of 6 to 8, having long back focus that allows insertion of an optical element such as a color separating prism while having a large aperture ratio with an F-number about 1.6, and having good performance throughout the zoom range and throughout the object distance range while leaving a space in which a complex stop mechanism can be provided and/or a space in which an ND filter can be provided.

In the following, numerical embodiments 1 to 8 corresponding to the first to eighth embodiments will be presented. The tables presented below show particulars of the numerical embodiments. In the tables, suffix number i represents the surface number counted from the object side. Thus, Ri represents the radius of curvature of the i-th surface, and Di represents the thickness of the member or the air gap between the i-th surface and the (i+1)-th surface. Ni represents the refractive index for the d-line and υi represents the Abbe number. In each numerical embodiment, the three surfaces closest to the image side correspond to a member(s) such as a quartz low pass filter and an infrared cut filter.

The aspherical surface shape is expressed by the following equation in terms of the height h from the optical axis and the displacement (or distance) x in the direction parallel to the optical axis at that height h from the vertex of the aspherical surface as the reference point:

$$x = \frac{(1/R)h^2}{1 + \sqrt{\{1 - (1+k)(h/R)^2\}}} + Bh^4 + Ch^6 + Dh^8 + Eh^{10} + Fh^{12}$$

where R is the paraxial radius of curvature, k is the conic constant, and B, C, D, E and F are aspherical coefficients.

In the following, the expression "e-X" stands for "×10$^{-x}$". For each numerical embodiment, the focal length f, the F-number Fno and half the angle of field ω will also be presented. Values associated with the above mentioned conditional expressions in the respective numerical embodiments will also be presented in Table 1.

Numerical Embodiment 1

| f | 1.00-5.84 | Fno | 1.66-2.66 | 2ω | 82.5-17.1 | | |
|---|---|---|---|---|---|---|---|
| R1 | 55.728 | D1 | 0.94 | N1 | 1.712995 | ν1 | 53.9 |
| R2 | 8.844 | D2 | 4.12 | | | | |
| R3 | −834.144 | D3 | 0.76 | N2 | 1.719995 | ν2 | 50.2 |
| R4 | 20.789 | D4 | 1.52 | | | | |
| R5 | 75.948 | D5 | 1.75 | N3 | 1.846660 | ν3 | 23.9 |
| R6 | −26.570 | D6 | 3.79 | | | | |
| R7 | 18.490 | D7 | 2.89 | N4 | 1.603112 | ν4 | 60.6 |
| R8 | −18.490 | D8 | 0.66 | | | | |
| R9 | −248.620 | D9 | 0.58 | N5 | 1.846660 | ν5 | 23.9 |
| R10 | 10.085 | D10 | 0.36 | | | | |
| R11 | 13.077 | D11 | 1.78 | N6 | 1.487490 | ν6 | 70.2 |
| R12 | −45.518 | D12 | 0.06 | | | | |
| R13 | 9.697 | D13 | 1.55 | N7 | 1.719995 | ν7 | 50.2 |
| R14 | 405.903 | D14 | variable | | | | |
| R15 | 11.623 | D15 | 0.29 | N8 | 1.882997 | ν8 | 40.8 |
| R16 | 2.651 | D16 | 0.99 | | | | |
| R17 | −22.930 | D17 | 1.20 | N9 | 1.808095 | ν9 | 22.8 |
| R18 | −3.673 | D18 | 0.50 | N10 | 1.859600 | ν10 | 40.4 |
| R19* | 6.115 | D19 | 0.50 | | | | |
| R20 | 5.964 | D20 | 1.13 | N11 | 1.603420 | ν11 | 38.0 |
| R21 | −5.964 | D21 | 0.20 | N12 | 1.882997 | ν12 | 40.8 |
| R22 | −10.871 | D22 | variable | | | | |
| R23 | stop | D23 | 1.40 | | | | |
| R24 | −5.867 | D24 | 0.23 | N13 | 1.638539 | ν13 | 55.4 |
| R25 | 4.070 | D25 | 1.14 | N14 | 1.683290 | ν14 | 31.4 |
| R26* | −18.373 | D26 | 1.86 | | | | |
| R27 | 30.383 | D27 | 1.61 | N15 | 1.548141 | ν15 | 45.8 |
| R28 | −4.309 | D28 | 0.29 | N16 | 2.003300 | ν16 | 28.3 |
| R29 | −7.062 | D29 | variable | | | | |
| R30 | 137.286 | D30 | 0.73 | N17 | 1.622992 | ν17 | 58.2 |
| R31 | −11.175 | D31 | 0.06 | | | | |
| R32 | 11.578 | D32 | 0.29 | N18 | 1.846660 | ν18 | 23.9 |
| R33 | 5.964 | D33 | 1.49 | N19 | 1.487490 | ν19 | 70.2 |
| R34 | −12.755 | D34 | variable | | | | |
| R35 | 11.547 | D35 | 0.85 | N20 | 1.487490 | ν20 | 70.2 |
| R36 | −8.906 | D36 | 0.26 | N21 | 1.647689 | ν21 | 33.8 |
| R37 | −114.307 | D37 | 1.75 | | | | |
| R38 | ∞ | D38 | 5.85 | N22 | 1.589130 | ν22 | 61.2 |
| R39 | ∞ | D39 | 1.10 | N23 | 1.516330 | ν23 | 64.2 |
| R40 | ∞ | | | | | | |

Aspherical surfaces are marked by asterisk *.
Aspherical Coefficient
R19 k = 9.57065e−01, B = −1.80926e−03, C = −4.75705e−05, D = 0.00, E = 0.00, F = 0.00
R26 k = −2.15005e+01, B = 5.86862e−04, C = 2.13598e−05, D = −7.76637e−07, E = 0.00, F = 0.00

| | focal length | | |
|---|---|---|---|
| variable distance | 1.00 | 3.93 | 5.84 |
| D14 | 0.29 | 6.37 | 7.53 |
| D22 | 8.30 | 2.22 | 1.06 |
| D29 | 1.82 | 1.32 | 1.83 |
| D34 | 1.15 | 1.65 | 1.14 |

Numerical Embodiment 2

| f | 1.00-5.84 | Fno | 1.68-2.65 | 2ω | 82.5-17.1 | | |
|---|---|---|---|---|---|---|---|
| R1 | 48.316 | D1 | 0.94 | N1 | 1.772499 | ν1 | 49.6 |
| R2 | 9.028 | D2 | 4.20 | | | | |
| R3 | −101.358 | D3 | 0.76 | N2 | 1.6838539 | ν2 | 55.4 |
| R4 | 20.481 | D4 | 1.36 | | | | |
| R5 | 71.694 | D5 | 1.75 | N3 | 1.846660 | ν3 | 23.9 |
| R6 | −25.772 | D6 | 3.94 | | | | |
| R7 | 18.654 | D7 | 2.69 | N4 | 1.603112 | ν4 | 60.6 |
| R8 | −18.654 | D8 | 0.82 | | | | |
| R9 | −206.775 | D9 | 0.58 | N5 | 1.846660 | ν5 | 23.9 |
| R10 | 10.347 | D10 | 0.34 | | | | |
| R11 | 13.343 | D11 | 1.76 | N6 | 1.487490 | ν6 | 70.2 |
| R12 | −44.086 | D12 | 0.06 | | | | |
| R13 | 9.939 | D13 | 1.44 | N7 | 1.719995 | ν7 | 50.2 |
| R14 | 447.751 | D14 | variable | | | | |
| R15 | 11.953 | D15 | 0.29 | N8 | 1.882997 | ν8 | 40.8 |
| R16 | 2.713 | D16 | 0.98 | | | | |
| R17 | −45.759 | D17 | 1.40 | N9 | 1.805181 | ν9 | 25.4 |
| R18 | −2.977 | D18 | 0.29 | N10 | 1.848620 | ν10 | 40.0 |
| R19* | 6.236 | D19 | 0.48 | | | | |
| R20 | 5.741 | D20 | 1.02 | N11 | 1.603420 | ν11 | 38.0 |
| R21 | −28.249 | D21 | variable | | | | |
| R22 | stop | D22 | 1.77 | | | | |
| R23 | −4.928 | D23 | 0.23 | N12 | 1.622992 | ν12 | 58.2 |
| R24 | 4.928 | D24 | 1.14 | N13 | 1.683290 | ν13 | 31.4 |
| R25* | −14.511 | D25 | 1.84 | | | | |
| R26 | 33.785 | D26 | 1.55 | N14 | 1.548141 | ν14 | 45.8 |
| R27 | −4.364 | D27 | 0.29 | N15 | 2.003300 | ν15 | 28.3 |
| R28 | −6.952 | D28 | variable | | | | |
| R29 | 61.240 | D29 | 0.73 | N16 | 1.603112 | ν16 | 60.6 |
| R30 | −11.708 | D30 | 0.06 | | | | |
| R31 | 11.643 | D31 | 0.29 | N17 | 1.846660 | ν17 | 23.9 |
| R32 | 5.931 | D32 | 1.58 | N18 | 1.487490 | ν18 | 70.2 |
| R33 | −13.771 | D33 | variable | | | | |
| R34 | 11.823 | D34 | 0.85 | N19 | 1.487490 | ν19 | 70.2 |
| R35 | −8.558 | D35 | 0.26 | N20 | 1.647689 | ν20 | 33.8 |
| R36 | −67.005 | D36 | 1.46 | | | | |
| R37 | ∞ | D37 | 5.85 | N21 | 1.589130 | ν21 | 61.2 |
| R38 | ∞ | D38 | 1.10 | N22 | 1.516330 | ν22 | 64.2 |
| R39 | ∞ | | | | | | |

Aspherical surfaces are marked by asterisk *.
Aspherical Coefficient
R19 k = 2.12088e+00, B = −2.35439e−03, C = −1.22931e−04, D = 0.00, E = 0.00, F = 0.00
R25 k = −1.62372e+00, B = 8.69232e−04, C = 9.25646e−06, D = −9.54787e−07, E = 0.00, F = 0.00

| | focal length | | |
|---|---|---|---|
| variable distance | 1.00 | 3.95 | 5.84 |
| D14 | 0.29 | 6.52 | 7.71 |
| D21 | 8.73 | 2.50 | 1.31 |
| D28 | 1.29 | 0.75 | 1.27 |
| D33 | 1.46 | 1.99 | 1.48 |

Numerical Embodiment 3

| f | 1.00-5.84 | Fno | 1.68-2.65 | 2ω | 82.5-17.1 | | |
|---|---|---|---|---|---|---|---|
| R1 | 60.659 | D1 | 0.94 | N1 | 1.712995 | ν1 | 53.9 |
| R2 | 9.219 | D2 | 4.50 | | | | |
| R3 | −48.636 | D3 | 0.76 | N2 | 1.638539 | ν2 | 55.4 |
| R4 | 25.034 | D4 | 1.40 | | | | |
| R5 | 103.195 | D5 | 1.90 | N3 | 1.846660 | ν3 | 23.9 |
| R6 | −21.633 | D6 | 4.41 | | | | |
| R7 | 19.247 | D7 | 2.83 | N4 | 1.603112 | ν4 | 60.6 |
| R8 | −19.247 | D8 | 0.18 | | | | |
| R9 | −931.793 | D9 | 0.58 | N5 | 1.846660 | ν5 | 23.9 |
| R10 | 10.240 | D10 | 0.51 | | | | |
| R11 | 15.325 | D11 | 1.55 | N6 | 1.487490 | ν6 | 70.2 |
| R12 | −94.158 | D12 | 0.06 | | | | |
| R13 | 9.951 | D13 | 1.58 | N7 | 1.693501 | ν7 | 53.2 |

-continued

Numerical Embodiment 3

| f | 1.00-5.84 | Fno | 1.68-2.65 | 2ω | 82.5-17.1 | |
|---|---|---|---|---|---|---|
| R14 | -960.836 | D14 | variable | | | |
| R15 | 12.119 | D15 | 0.29 | N8 | 1.882997 ν8 | 40.8 |
| R16 | 2.947 | D16 | 1.00 | | | |
| R17 | -40.088 | D17 | 1.40 | N9 | 1.805181 ν9 | 25.4 |
| R18 | -3.447 | D18 | 0.47 | N10 | 1.848620 ν10 | 40.0 |
| R19* | 5.933 | D19 | 0.50 | | | |
| R20 | 5.803 | D20 | 1.02 | N11 | 1.603420 ν11 | 38.0 |
| R21 | -11.104 | D21 | 0.23 | N12 | 1.882997 ν12 | 40.8 |
| R22 | -16.758 | D22 | variable | | | |
| R23 | stop | D23 | 2.01 | | | |
| R24 | -5.111 | D24 | 0.23 | N13 | 1.638539 ν13 | 55.4 |
| R25 | 5.111 | D25 | 1.14 | N14 | 1.683290 ν14 | 31.4 |
| R26* | -15.680 | D26 | 1.90 | | | |
| R27 | 79.346 | D27 | 1.17 | N15 | 1.433870 ν15 | 95.1 |
| R28 | -7.368 | D28 | variable | | | |
| R29 | 23.538 | D29 | 0.73 | N16 | 1.603112 ν16 | 60.6 |
| R30 | -16.898 | D30 | 0.06 | | | |
| R31 | 15.764 | D31 | 0.29 | N17 | 1.846660 ν17 | 23.9 |
| R32 | 6.655 | D32 | 1.58 | N18 | 1.487490 ν18 | 70.2 |
| R33 | -10.971 | D33 | variable | | | |
| R34 | 13.317 | D34 | 0.85 | N19 | 1.487490 ν19 | 70.2 |
| R35 | -8.206 | D35 | 0.26 | N20 | 1.698947 ν20 | 30.1 |
| R36 | -32.545 | D36 | 1.46 | | | |
| R37 | ∞ | D37 | 5.85 | N21 | 1.589130 ν21 | 61.2 |
| R38 | ∞ | D38 | 1.10 | N22 | 1.516330 ν22 | 64.2 |
| R39 | ∞ | | | | | |

Aspherical surfaces are marked by asterisk *.
Aspherical Coefficient
R19 k = 1.55464e+00, B = -1.88361e-03, C = -6.82493e-05, D = 0.00, E = 0.00, F = 0.00
R26 k = -1.54951e+00, B = 1.33596e-03, C = 2.64342e-05, D = -6.62544e-07, E = 0.00, F = 0.00

| | focal length | | |
|---|---|---|---|
| variable distance | 1.00 | 3.94 | 5.84 |
| D14 | 0.29 | 7.25 | 8.58 |
| D22 | 9.50 | 2.54 | 1.22 |
| D28 | 1.46 | 0.94 | 1.42 |
| D33 | 1.42 | 1.94 | 1.46 |

Numerical Embodiment 4

| f | 1.00-5.84 | Fno | 1.68-2.65 | 2ω | 82.5-17.1 | |
|---|---|---|---|---|---|---|
| R1 | 54.227 | D1 | 0.94 | N1 | 1.772499 ν1 | 49.6 |
| R2 | 9.750 | D2 | 4.35 | | | |
| R3 | -53.303 | D3 | 0.76 | N2 | 1.638539 ν2 | 55.4 |
| R4 | 20.328 | D4 | 2.29 | | | |
| R5 | 211.980 | D5 | 1.90 | N3 | 1.846660 ν3 | 23.9 |
| R6 | -20.320 | D6 | 4.31 | | | |
| R7 | 19.940 | D7 | 2.83 | N4 | 1.603112 ν4 | 60.6 |
| R8 | -19.940 | D8 | 0.88 | | | |
| R9 | -938.652 | D9 | 0.58 | N5 | 1.846660 ν5 | 23.9 |
| R10 | 10.223 | D10 | 0.39 | | | |
| R11 | 14.337 | D11 | 1.45 | N6 | 1.487490 ν6 | 70.2 |
| R12 | -142.318 | D12 | 0.06 | | | |
| R13 | 9.842 | D13 | 1.45 | N7 | 1.696797 ν7 | 55.5 |
| R14 | 590.969 | D14 | variable | | | |
| R15 | 11.796 | D15 | 0.29 | N8 | 1.882997 ν8 | 40.8 |
| R16 | 2.928 | D16 | 0.96 | | | |
| R17 | -110.824 | D17 | 1.40 | N9 | 1.808095 ν9 | 22.8 |
| R18 | -4.808 | D18 | 0.47 | N10 | 1.848620 ν10 | 40.0 |
| R19* | 6.221 | D19 | 0.42 | | | |
| R20 | 5.470 | D20 | 1.02 | N11 | 1.603420 ν11 | 38.0 |
| R21 | -7.007 | D21 | 0.23 | N12 | 1.882997 ν12 | 40.8 |
| R22 | -19.590 | D22 | variable | | | |
| R23 | stop | D23 | 2.44 | | | |
| R24 | -5.647 | D24 | 0.23 | N13 | 1.638539 ν13 | 55.4 |
| R25 | 5.647 | D25 | 1.14 | N14 | 1.683290 ν14 | 31.4 |
| R26* | -18.563 | D26 | 2.14 | | | |
| R27 | 77.058 | D27 | 1.17 | N15 | 1.496999 ν15 | 81.5 |
| R28 | -8.491 | D28 | variable | | | |
| R29 | 26.207 | D29 | 0.73 | N16 | 1.603112 ν16 | 60.6 |
| R30 | -17.547 | D30 | 0.06 | | | |
| R31 | 14.490 | D31 | 0.29 | N17 | 1.846660 ν17 | 23.9 |
| R32 | 6.816 | D32 | 1.58 | N18 | 1.496999 ν18 | 81.6 |
| R33 | -13.363 | D33 | variable | | | |
| R34 | 15.647 | D34 | 0.85 | N19 | 1.487490 ν19 | 70.2 |
| R35 | -8.463 | D35 | 0.26 | N20 | 1.698947 ν20 | 30.1 |
| R36 | -32.700 | D36 | 1.46 | | | |
| R37 | ∞ | D37 | 5.84 | N21 | 1.589130 ν21 | 61.2 |
| R38 | ∞ | D38 | 1.10 | N22 | 1.516330 ν22 | 64.2 |
| R39 | ∞ | | | | | |

Aspherical surfaces are marked by asterisk *.
Aspherical Coefficient
R19 k = 1.36203e+00, B = -1.54961e-03, C = -5.12136e-05, D = 0.00, E = 0.00, F = 0.00
R26 k = -4.82085e+00, B = 1.07535e-03, C = 1.96665e-05, D = -6.81464e-07, E = 0.00, F = 0.00

| | focal length | | |
|---|---|---|---|
| variable distance | 1.00 | 3.95 | 5.84 |
| D14 | 0.29 | 7.36 | 8.71 |
| D22 | 9.49 | 2.43 | 1.08 |
| D28 | 1.46 | 0.77 | 1.17 |
| D33 | 1.87 | 2.55 | 2.16 |

Numerical Embodiment 5

| f | 1.00-7.64 | Fno | 1.66-2.95 | 2ω | 82.5-13.1 | |
|---|---|---|---|---|---|---|
| R1 | 60.588 | D1 | 0.93 | N1 | 1.712995 ν1 | 53.9 |
| R2 | 9.071 | D2 | 4.19 | | | |
| R3 | 1747.387 | D3 | 0.76 | N2 | 1.719995 ν2 | 50.2 |
| R4 | 22.573 | D4 | 1.48 | | | |
| R5 | 77.437 | D5 | 1.78 | N3 | 1.846660 ν3 | 23.9 |
| R6 | -25.177 | D6 | 3.90 | | | |
| R7 | 18.577 | D7 | 2.98 | N4 | 1.603112 ν4 | 60.6 |
| R8 | -18.577 | D8 | 0.25 | | | |
| R9 | -205.801 | D9 | 0.58 | N5 | 1.846660 ν5 | 23.9 |
| R10 | 10.137 | D10 | 0.40 | | | |
| R11 | 13.449 | D11 | 1.78 | N6 | 1.487490 ν6 | 70.2 |
| R12 | -66.098 | D12 | 0.06 | | | |
| R13 | 9.857 | D13 | 1.58 | N7 | 1.719995 ν7 | 50.2 |
| R14 | 460.450 | D14 | variable | | | |
| R15 | 11.110 | D15 | 0.29 | N8 | 1.882997 ν8 | 40.8 |
| R16 | 2.652 | D16 | 1.05 | | | |
| R17 | -25.710 | D17 | 1.20 | N9 | 1.808095 ν9 | 22.8 |
| R18 | -3.602 | D18 | 0.50 | N10 | 1.859600 ν10 | 40.4 |
| R19* | 5.810 | D19 | 0.50 | | | |
| R20 | 5.695 | D20 | 1.14 | N11 | 1.603420 ν11 | 38.0 |
| R21 | -5.695 | D21 | 0.20 | N12 | 1.882997 ν12 | 40.8 |
| R22 | -11.597 | D22 | variable | | | |
| R23 | stop | D23 | 1.06 | | | |
| R24 | -6.017 | D24 | 0.23 | N13 | 1.638539 ν13 | 55.4 |
| R25 | 4.380 | D25 | 1.14 | N14 | 1.683290 ν14 | 31.4 |
| R26* | -18.056 | D26 | 1.84 | | | |
| R27 | 27.200 | D27 | 1.61 | N15 | 1.548141 ν15 | 45.8 |

-continued

Numerical Embodiment 5

| f | 1.00-7.64 | Fno | 1.66-2.95 | 2ω | 82.5-13.1 | | |
|---|---|---|---|---|---|---|---|
| R28 | −4.307 | D28 | 0.29 | N16 | 2.003300 | v16 | 28.3 |
| R29 | −7.070 | D29 | variable | | | | |
| R30 | 140.480 | D30 | 0.73 | N17 | 1.622992 | v17 | 58.2 |
| R31 | −11.298 | D31 | 0.06 | | | | |
| R32 | 11.963 | D32 | 0.29 | N18 | 1.846660 | v18 | 23.9 |
| R33 | 6.100 | D33 | 1.49 | N19 | 1.487490 | v19 | 70.2 |
| R34 | −13.286 | D34 | variable | | | | |
| R35 | 12.235 | D35 | 0.85 | N20 | 1.487490 | v20 | 70.2 |
| R36 | −8.964 | D36 | 0.26 | N21 | 1.647689 | v21 | 33.8 |
| R37 | −90.929 | D37 | 1.75 | | | | |
| R38 | ∞ | D38 | 5.84 | N22 | 1.589130 | v22 | 61.2 |
| R39 | ∞ | D39 | 1.10 | N23 | 1.516330 | v23 | 64.2 |
| R40 | ∞ | | | | | | |

Aspherical surfaces are marked by asterisk *.
Aspherical Coefficient
R19 k = 7.27547e−01, B = −1.74498e−03, C = −4.15999e−05, D = 0.00, E = 0.00, F = 0.00
R26 k = −2.11922e+01, B = 4.97721e−04, C = 2.24620e−05, D = −1.74512e−06, E = 0.00, F = 0.00

| | focal length | | |
|---|---|---|---|
| variable distance | 1.00 | 4.73 | 7.64 |
| D14 | 0.29 | 7.11 | 8.41 |
| D22 | 9.03 | 2.20 | 0.91 |
| D29 | 1.81 | 1.18 | 2.07 |
| D34 | 1.31 | 1.93 | 1.05 |

Numerical Embodiment 6

| f | 1.00-5.84 | Fno | 1.66-2.06 | 2ω | 82.5-17.1 | | |
|---|---|---|---|---|---|---|---|
| R1 | 39.180 | D1 | 0.94 | N1 | 1.712995 | v1 | 53.9 |
| R2 | 8.296 | D2 | 4.31 | | | | |
| R3 | −586.941 | D3 | 0.76 | N2 | 1.719995 | v2 | 50.2 |
| R4 | 16.889 | D4 | 1.70 | | | | |
| R5 | 42.969 | D5 | 1.87 | N3 | 1.846660 | v3 | 23.9 |
| R6 | −28.993 | D6 | 4.44 | | | | |
| R7 | 20.532 | D7 | 2.78 | N4 | 1.693501 | v4 | 53.2 |
| R8 | −20.532 | D8 | 0.15 | | | | |
| R9 | 2981.244 | D9 | 0.58 | N5 | 1.846660 | v5 | 23.9 |
| R10 | 7.932 | D10 | 2.64 | N6 | 1.496999 | v6 | 81.5 |
| R11 | −343.826 | D11 | 0.06 | | | | |
| R12 | 10.456 | D12 | 1.55 | N7 | 1.834000 | v7 | 37.2 |
| R13 | 134.579 | D13 | variable | | | | |
| R14 | 11.099 | D14 | 0.29 | N8 | 1.882997 | v8 | 40.8 |
| R15 | 2.614 | D15 | 1.05 | | | | |
| R16 | −22.875 | D16 | 1.20 | N9 | 1.808095 | v9 | 22.8 |
| R17 | −3.697 | D17 | 0.50 | N10 | 1.859600 | v10 | 40.4 |
| R18* | 5.828 | D18 | 0.51 | | | | |
| R19 | 5.907 | D19 | 1.13 | N11 | 1.603420 | v11 | 38.0 |
| R20 | −5.907 | D20 | 0.20 | N12 | 1.882997 | v12 | 40.8 |
| R21 | −11.060 | D21 | variable | | | | |
| R22 | stop | D22 | 0.98 | | | | |
| R23 | −5.869 | D23 | 0.23 | N13 | 1.638539 | v13 | 55.4 |
| R24 | 4.135 | D24 | 1.14 | N14 | 1.683290 | v14 | 31.4 |
| R25* | −18.230 | D25 | 1.84 | | | | |
| R26 | 29.742 | D26 | 1.61 | N15 | 1.548141 | v15 | 45.8 |
| R27 | −4.311 | D27 | 0.29 | N16 | 2.003300 | v16 | 28.3 |
| R28 | −7.073 | D28 | variable | | | | |
| R29 | 149.677 | D29 | 0.73 | N17 | 1.622992 | v17 | 58.2 |
| R30 | −11.179 | D30 | 0.06 | | | | |
| R31 | 11.578 | D31 | 0.29 | N18 | 1.846660 | v18 | 23.9 |
| R32 | 5.987 | D32 | 1.54 | N19 | 1.487490 | v19 | 70.2 |
| R33 | −12.771 | D33 | variable | | | | |

-continued

Numerical Embodiment 6

| f | 1.00-5.84 | Fno | 1.66-2.06 | 2ω | 82.5-17.1 | | |
|---|---|---|---|---|---|---|---|
| R34 | 11.426 | D34 | 0.85 | N20 | 1.487490 | v20 | 70.2 |
| R35 | −9.059 | D35 | 0.26 | N21 | 1.647689 | v21 | 33.8 |
| R36 | −104.038 | D36 | 1.75 | | | | |
| R37 | ∞ | D37 | 5.84 | N22 | 1.589130 | v22 | 61.2 |
| R38 | ∞ | D38 | 1.10 | N23 | 1.516330 | v23 | 64.2 |
| R39 | ∞ | | | | | | |

Aspherical surfaces are marked by asterisk *.
Aspherical Coefficient
R18 k = 5.36513e−02, B = −1.49583e−03, C = −3.74820e−05, D = 0.00000e+00, E = 0.00000e+00, F = 0.00000E+00
R25 k = −1.04670e+01, B = 8.10605e−04, C = 9.09617e−06, D = −1.95751e−07, E = 0.00000e+00, F = 0.00000E+00

| | focal length | | |
|---|---|---|---|
| variable distance | 1.00 | 3.92 | 5.84 |
| D13 | 0.29 | 6.13 | 7.24 |
| D21 | 8.44 | 2.60 | 1.49 |
| D28 | 1.83 | 1.30 | 1.82 |
| D33 | 1.14 | 1.66 | 1.14 |

Numerical Embodiment 7

| f | 1.00-7.45 | Fno | 1.66-2.95 | 2ω | 82.4-13.4 | | |
|---|---|---|---|---|---|---|---|
| R1 | 44.646 | D1 | 0.93 | N1 | 1.712995 | v1 | 53.9 |
| R2 | 9.256 | D2 | 4.79 | | | | |
| R3 | −38.531 | D3 | 0.85 | N2 | 1.719995 | v2 | 50.2 |
| R4 | 22.491 | D4 | 1.68 | | | | |
| R5 | 97.614 | D5 | 2.34 | N3 | 1.846660 | v3 | 23.9 |
| R6 | −19.144 | D6 | 4.61 | | | | |
| R7 | 19.465 | D7 | 2.80 | N4 | 1.603112 | v4 | 60.6 |
| R8 | −19.465 | D8 | 0.35 | | | | |
| R9 | −186.277 | D9 | 0.58 | N5 | 1.846660 | v5 | 23.9 |
| R10 | 10.161 | D10 | 0.40 | | | | |
| R11 | 13.429 | D11 | 1.67 | N6 | 1.487490 | v6 | 70.2 |
| R12 | −1198.396 | D12 | 0.06 | | | | |
| R13 | 10.478 | D13 | 1.66 | N7 | 1.719995 | v7 | 50.2 |
| R14 | 527.489 | D14 | variable | | | | |
| R15 | 8.123 | D15 | 0.29 | N8 | 1.882997 | v8 | 40.8 |
| R16 | 2.730 | D16 | 1.12 | | | | |
| R17 | −15.211 | D17 | 1.20 | N9 | 1.808095 | v9 | 22.8 |
| R18 | −4.132 | D18 | 0.50 | N10 | 1.859600 | v10 | 40.4 |
| R19* | 6.400 | D19 | 0.49 | | | | |
| R20 | 5.919 | D20 | 1.14 | N11 | 1.603420 | v11 | 38.0 |
| R21 | −5.919 | D21 | 0.20 | N12 | 1.882997 | v12 | 40.8 |
| R22 | −10.468 | D22 | variable | | | | |
| R23 | stop | D23 | 0.99 | | | | |
| R24 | −7.326 | D24 | 0.23 | N13 | 1.638539 | v13 | 55.4 |
| R25 | 6.214 | D25 | 1.14 | N14 | 1.683290 | v14 | 31.4 |
| R26* | −18.567 | D26 | 2.34 | | | | |
| R27 | 111.556 | D27 | 1.61 | N15 | 1.548141 | v15 | 45.8 |
| R28 | −4.520 | D28 | 0.29 | N16 | 2.003300 | v16 | 28.3 |
| R29 | −6.535 | D29 | variable | | | | |
| R30 | 45.509 | D30 | 0.82 | N17 | 1.638539 | v17 | 55.4 |
| R31 | −12.261 | D31 | 0.06 | | | | |
| R32 | 8.890 | D32 | 0.29 | N18 | 1.922860 | v18 | 18.9 |
| R33 | 5.630 | D33 | 1.49 | N19 | 1.433870 | v19 | 95.1 |
| R34 | −14.661 | D34 | variable | | | | |
| R35 | ∞ | D35 | 0.85 | N20 | 1.487490 | v20 | 70.2 |
| R36 | ∞ | D36 | 0.26 | N21 | 1.647689 | v21 | 33.8 |
| R37 | ∞ | D37 | 1.75 | | | | |

-continued

Numerical Embodiment 7

| f | 1.00-7.45 | Fno | 1.66-2.95 | 2ω | 82.4-13.4 | |
|---|---|---|---|---|---|---|
| R38 | ∞ | D38 | 5.84 | N22 | 1.589130 | ν22 | 61.2 |
| R39 | ∞ | D39 | 1.10 | N23 | 1.516330 | ν23 | 64.2 |
| R40 | ∞ | | | | | |

Aspherical surfaces are marked by asterisk *.
Aspherical Coefficient
R19 k = 3.19964e−01, B = −8.14760e−04, C = 3.43387e−05, D = 0.0, E = 0.00, F = 0.00
R26 k = −3.69462e+01, B = 5.20021e−04, C = 5.10133e−05, D = −3.02259e−06, E = 0.00, F = 0.00

| | focal length | | |
|---|---|---|---|
| variable distance | 1.00 | 4.61 | 7.45 |
| D14 | 0.29 | 8.60 | 10.18 |
| D22 | 10.79 | 2.49 | 0.91 |
| D29 | 0.77 | 0.31 | 0.78 |
| D34 | 0.93 | 1.39 | 0.93 |

Numerical Embodiment 8

| f | 1.00-4.70 | Fno | 1.66-2.06 | 2ω | 82.3-21.1 | | |
|---|---|---|---|---|---|---|---|
| R1 | 100.213 | D1 | 0.93 | N1 | 1.712995 | ν1 | 53.9 |
| R2 | 11.631 | D2 | 4.58 | | | | |
| R3 | −38.830 | D3 | 0.84 | N2 | 1.719995 | ν2 | 50.2 |
| R4 | 24.269 | D4 | 2.11 | | | | |
| R5 | −34222.160 | D5 | 2.33 | N3 | 1.846660 | ν3 | 23.9 |
| R6 | −19.876 | D6 | 5.64 | | | | |
| R7 | 22.370 | D7 | 2.80 | N4 | 1.563839 | ν4 | 60.7 |
| R8 | −22.370 | D8 | 0.39 | | | | |
| R9 | 26.314 | D9 | 0.58 | N5 | 1.846660 | ν5 | 23.9 |
| R10 | 8.291 | D10 | 2.37 | N6 | 1.518229 | ν6 | 58.9 |
| R11 | 43.630 | D11 | 0.06 | | | | |
| R12 | 9.495 | D12 | 1.60 | N7 | 1.517417 | ν7 | 52.4 |
| R13 | 54.537 | D13 | variable | | | | |
| R14 | 7.817 | D14 | 0.29 | N8 | 1.882997 | ν8 | 40.8 |
| R15 | 2.724 | D15 | 1.23 | | | | |
| R16 | −12.708 | D16 | 1.19 | N9 | 1.808095 | ν9 | 22.8 |
| R17 | −4.264 | D17 | 0.50 | N10 | 1.859600 | ν10 | 40.4 |
| R18* | 7.038 | D18 | 0.47 | | | | |
| R19 | 5.999 | D19 | 1.14 | N11 | 1.603420 | ν11 | 38.0 |
| R20 | −5.999 | D20 | 0.20 | N12 | 1.882997 | ν12 | 40.8 |
| R21 | −10.274 | D21 | variable | | | | |
| R22 | stop | D22 | 1.02 | | | | |
| R23 | −6.566 | D23 | 0.23 | N13 | 1.638539 | ν13 | 55.4 |
| R24 | 9.486 | D24 | 1.14 | N14 | 1.688931 | ν14 | 31.1 |
| R25* | −17.487 | D25 | 2.22 | | | | |
| R26 | 158.312 | D26 | 1.60 | N15 | 1.548141 | ν15 | 45.8 |
| R27 | −4.600 | D27 | 0.29 | N16 | 2.003300 | ν16 | 28.3 |
| R28 | −6.538 | D28 | variable | | | | |
| R29 | 46.927 | D29 | 0.82 | N17 | 1.638539 | ν17 | 55.4 |
| R30 | −11.673 | D30 | 0.06 | | | | |
| R31 | 8.348 | D31 | 0.29 | N18 | 1.922860 | ν18 | 18.9 |
| R32 | 5.556 | D32 | 1.49 | N19 | 1.433870 | ν19 | 95.1 |
| R33 | −17.557 | D33 | variable | | | | |
| R34 | ∞ | D34 | 0.84 | N20 | 1.487490 | ν20 | 70.2 |
| R35 | ∞ | D35 | 0.26 | N21 | 1.647689 | ν21 | 33.8 |
| R36 | ∞ | D36 | 1.75 | | | | |
| R37 | ∞ | D37 | 5.83 | N22 | 1.589130 | ν22 | 61.2 |
| R38 | ∞ | D38 | 1.09 | N23 | 1.516330 | ν23 | 64.2 |
| R39 | ∞ | | | | | | |

Aspherical surfaces are marked by asterisk *.
Aspherical Coefficient
R18 k = 6.36477e−02, B = −5.39706e−04, C = 5.86560e−05, D = 0.0, E = 0.00000e+00, F = 0.00000e+00
R25 k = −4.67145e+01, B = 1.13187e−04, C = 8.62692e−05, D = −4.62136e−06, E = 0.00000e+00, F = 0.00000e+00

| | focal length | | |
|---|---|---|---|
| variable distance | 1.00 | 3.35 | 4.70 |
| D13 | 0.29 | 7.69 | 9.09 |
| D21 | 11.29 | 3.90 | 2.49 |
| D28 | 0.75 | 0.25 | 0.29 |
| D33 | 0.78 | 1.28 | 1.24 |

TABLE 1

| conditional expression | numeral embodiment | | | | | | | |
|---|---|---|---|---|---|---|---|---|
| | 1 | 2 | 3 | 4 | 5 | 6 | 7 | 8 |
| (1) | 2.68 | 2.54 | 2.80 | 2.68 | 3.05 | 3.06 | 2.78 | 2.28 |
| (2) | −4.43 | −4.62 | −5.47 | −5.82 | −4.36 | −4.09 | −6.40 | −6.44 |
| (3) | −0.032 | −0.039 | −0.009 | −0.009 | −0.041 | 0.003 | −0.049 | 0.379 |
| (4) | 3.62 | 3.69 | 4.11 | 4.01 | 3.50 | 3.47 | 4.19 | 4.34 |
| (5) | 8.13 | 7.99 | 8.18 | 8.18 | 8.12 | 8.122 | 10.26 | 10.21 |
| (6) | 0.022 | 0.020 | 0.026 | 0.037 | 0.030 | 0.023 | 0.074 | 0.057 |
| (7) | 0.52 | 0.52 | 0.60 | 0.60 | 0.59 | 0.59 | 0.69 | 0.52 |
| (8) | 2.50 | 2.93 | 2.38 | 1.60 | 1.81 | 2.53 | — | — |

By designing the lens configurations as specified according to the embodiments described in the foregoing, it is possible to provide zoom lenses having a wide angle of view and a high zoom ratio while achieving excellent optical performance throughout the zoom range.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-145153, filed May 25, 2006, which is hereby incorporated by reference herein in its entirety.

What is claimed is:

1. A zoom lens comprising, in the following order from the object side to the image side:
   a positive first lens unit;
   a negative second lens unit, the second lens unit moving during zooming;
   a positive third lens unit; and
   a positive fourth lens unit, the fourth lens unit moving during zooming,
   wherein the first lens unit includes a negative lens subunit and a positive lens subunit,
   the negative lens subunit includes at least two negative lenses each having a concave surface facing the image side and at least one positive lens arranged in the mentioned order from the object side, and
   the positive lens subunit includes at least one biconvex positive lens, a negative lens and at least two positive lenses arranged in the mentioned order from the object side, or at least one biconvex positive lens, a cemented lens composed of a negative lens and a positive lens and at least one positive lens arranged in the mentioned order from the object side.

2. A zoom lens according to claim 1, wherein the absolute value of the refractive power of the object side surface of the positive lens disposed closest to the image side in the positive lens subunit is larger than the absolute value of the refractive power of the image side surface of the positive lens disposed closest to the image side in the positive lens subunit, and the object side surface of the positive lens disposed closest to the image side in the positive lens subunit is a convex surface.

3. A zoom lens according to claim 1, wherein in the case where the positive lens subunit includes at least one biconvex positive lens, a negative lens and at least two positive lenses arranged in the mentioned order from the object side, said at least two positive lens comprises two positive lenses each having a convex surface facing the object side, and in the case where the positive lens subunit includes at least one biconvex positive lens, a cemented lens composed of a negative lens and a positive lens and at least one positive lens arranged in the mentioned order from the object side, the at least one positive lens comprises one or two positive lenses each having a convex surface facing the object side.

4. A zoom lens according to claim 1 further comprising a positive fifth lens unit disposed on the image side of the fourth lens unit.

5. A zoom lens according to claim 1 satisfying the following condition:

$$1.2 < f3/f5 < 3.6$$

where f3 is the focal length of the third lens unit, and f5 is the focal length of the fifth lens unit.

6. A zoom lens according to claim 1 satisfying the following condition:

$$1.8 < |f1a/f1| < 4.0$$

where $f1a$ is the focal length of the negative lens subunit, and f1 is the focal length of the first lens unit.

7. A zoom lens according to claim 1 satisfying the following condition:

$$-7.7 < H12w/fw < -3.5$$

where $H12w$ is the principal point interval of the first lens unit and the second lens unit at the wide angle end, and fw is the focal length of the entire lens system at the wide angle end.

8. A zoom lens according to claim 1 satisfying the following condition:

$$-0.09 < f1/R1bF < 0.455$$

where $R1bF$ is the radius of curvature of the object side surface of the negative lens in the positive lens subunit, and f1 is the focal length of the first lens unit.

9. A zoom lens according to claim 1 satisfying the following conditions:

$$2.8 < |f2/fw| < 5.2$$

$$6.4 < BF \times \sqrt{F_{no}W}/fw < 15.0$$

where f2 is the focal length of the second lens unit, fw is the focal length of the entire system at the wide angle end, $F_{no}W$ is the F-number of the entire lens system at the wide angle end, and BF is the equivalent distance in air of the distance from the lens surface closest to the image side to an image plane at the wide angle end.

10. A zoom lens according to claim 1, wherein the third lens unit includes a plurality of lenses arranged with at least one air gap therebetween, and the zoom lens satisfies the following condition:

$$0.01 < D3a/f3 < 0.1$$

where $D3a$ is the length of said at least one air gap along the optical axis, and f3 is the focal length of the third lens unit.

11. A zoom lens according to claim 1 satisfying the following condition:

$$0.02 < f1/f1FF < 0.83$$

where f1FF is the focal length of the composite lens system composed of the negative lens subunit and the biconvex positive lens in the positive lens subunit, and f1 is the focal length of the first lens unit.

12. A zoom lens according to claim 1, wherein the zoom lens is adapted to form an image of an object on a solid state image pickup element.

13. An image pickup apparatus comprising:
   a solid state image pickup element; and
   a zoom lens according to claim 1 adapted to form an image on the solid state image pickup element.

14. A zoom lens comprising, in the following order from the object side to the image side:
   a positive first lens unit;
   a negative second lens unit, the second lens unit moving during zooming;
   a positive third lens unit; and
   a positive fourth lens unit, the fourth lens unit moving during zooming,
   wherein the first lens unit includes a negative lens subunit and a positive lens subunit,
   the negative lens subunit includes at least two negative lenses each having a concave surface facing the image side and at least one positive lens, and said positive lens subunit includes at least three positive lenses and at least one negative lens, or at least two positive lenses and a cemented lens composed of a negative lens and a positive lens.

15. An image pickup apparatus comprising:
a solid state image pickup element; and
a zoom lens according to claim 14 adapted to form an image on the solid state image pickup element.

16. A zoom lens comprising, in the following order from the object side to the image side:
a positive first lens unit;
a negative second lens unit, the second lens unit moving during zooming;
a positive third lens unit; and
a positive fourth lens unit, the fourth lens unit moving during zooming,
wherein the first lens unit includes a negative lens subunit and a positive lens subunit,
the negative lens subunit includes two negative lenses each having a concave surface facing the image side and a biconvex positive lens, the absolute value of the refractive power of the image side surface of the biconvex positive lens being larger than the absolute value of the refractive power of the object side surface of the same positive lens, and
the positive lens subunit includes a biconvex positive lens, a negative lens or a cemented lens composed of a negative lens and a positive lens, and a positive lens having a convex surface facing the object side, the absolute value of the refractive power of the object side surface of the last mentioned positive lens being larger than the absolute value of the refractive power of the image side surface of the same positive lens.

17. An image pickup apparatus comprising:
a solid state image pickup element; and
a zoom lens according to claim 16 adapted to form an image on the solid state image pickup element.

18. A zoom lens comprising, in the following order from the object side to the image side:
a positive first lens unit;
a negative second lens unit, the second lens unit moving during zooming;
a positive third lens unit; and
a positive fourth lens unit, the fourth lens unit moving during zooming,
wherein the first lens unit includes a negative lens subunit and a positive lens subunit,
the negative lens subunit includes two negative lenses each having a concave surface facing the image side and a biconvex positive lens, the absolute value of the refractive power of the image side surface of the biconvex positive lens being larger than the absolute value of the refractive power of the object side surface of the same positive lens, and
the positive lens subunit includes a biconvex positive lens, a negative lens having a concave surface facing the image side or a cemented lens composed of a negative lens having a concave surface facing the image side and a positive lens, and two positive lenses each having a convex surface facing the object side.

19. An image pickup apparatus comprising:
a solid state image pickup element; and
a zoom lens according to claim 18 adapted to form an image on the solid state image pickup element.

* * * * *